(12) United States Patent
Koshimoto et al.

(10) Patent No.: US 11,092,112 B2
(45) Date of Patent: Aug. 17, 2021

(54) HIGH-PRESSURE PUMP

(71) Applicant: DENSO CORPORATION, Kariya (JP)

(72) Inventors: Shinichiro Koshimoto, Kariya (JP); Masaharu Nakaoka, Kariya (JP)

(73) Assignee: DENSO CORPORATION, Kariya (JP)

( * ) Notice: Subject to any disclaimer, the term of this patent is extended or adjusted under 35 U.S.C. 154(b) by 128 days.

(21) Appl. No.: 16/550,362

(22) Filed: Aug. 26, 2019

(65) Prior Publication Data

US 2019/0376472 A1 Dec. 12, 2019

Related U.S. Application Data

(63) Continuation of application No. PCT/JP2018/008220, filed on Mar. 5, 2018.

(30) Foreign Application Priority Data

Mar. 7, 2017 (JP) .............................. JP2017-043212

(51) Int. Cl.
*F02M 21/02* (2006.01)
*F04B 11/00* (2006.01)
*F04B 15/06* (2006.01)
*F02M 37/06* (2006.01)
*F02M 59/36* (2006.01)
(Continued)

(52) U.S. Cl.
CPC .... *F02M 21/0242* (2013.01); *F02M 21/0245* (2013.01); *F02M 37/06* (2013.01);
(Continued)

(58) Field of Classification Search
CPC ........... F02M 21/0242; F02M 21/0245; F02M 37/06; F02M 59/36; F04B 11/0008;
(Continued)

(56) References Cited

U.S. PATENT DOCUMENTS 4,974,628 A * 12/1990 Tepermeister ...... F04B 53/1002
137/454.4
2006/0222538 A1 10/2006 Inoue et al.
(Continued)

FOREIGN PATENT DOCUMENTS

JP 2014-105668 6/2014
JP 2015-218678 12/2015
(Continued)

OTHER PUBLICATIONS

Translation of application KR20160047297, priority document of USPGPUB 2017298886. Retrieved from Espacenet on Feb. 26, 2021. Espacenet URL: https://register.epo.org/ipfwretrieve?apn=KR.20160047297.A&lng=en (Year: 2016).*
(Continued)

*Primary Examiner* — Jessica Cahill
*Assistant Examiner* — Patrick C Williams
(74) *Attorney, Agent, or Firm* — Nixon & Vanderhye P.C.

(57) ABSTRACT

A high-pressure pump is configured to pressurize fuel. The high-pressure pump includes a relief valve device that is placed in a relief passage, which has one end part connected to a discharge passage in a housing while another end part of the relief passage is configured to be communicated with a suction passage in the housing. The discharge passage is configured to conduct the fuel, which is pressurized in and discharged from a pressurizing chamber. The relief valve device is configured to enable or limit a flow of the fuel between one side of the relief passage, at which the discharge passage is located, and another side of the relief passage, which is opposite to the discharge passage, at a valve opening time or a valve closing time of the relief valve device.

13 Claims, 8 Drawing Sheets

(51) Int. Cl.
*F04C 28/26* (2006.01)
*F04C 15/00* (2006.01)

(52) U.S. Cl.
CPC ......... *F02M 59/36* (2013.01); *F04B 11/0008* (2013.01); *F04B 15/06* (2013.01); *F04C 28/265* (2013.01); *F04C 15/0049* (2013.01); *Y02T 10/30* (2013.01)

(58) Field of Classification Search
CPC .... F04B 15/06; F04C 28/265; F04C 15/0049; Y02T 10/30
See application file for complete search history.

(56) References Cited

U.S. PATENT DOCUMENTS

| | | | | |
|---|---|---|---|---|
| 2007/0110603 | A1* | 5/2007 | Usui | ........................ F04B 49/08 417/505 |
| 2007/0286742 | A1* | 12/2007 | Inoue | .................... F04B 1/0452 417/269 |
| 2009/0110575 | A1* | 4/2009 | Munakata | .............. F02M 59/48 417/437 |
| 2011/0209687 | A1 | 9/2011 | Schroeder et al. | |
| 2011/0247488 | A1 | 10/2011 | Oikawa | |
| 2012/0312278 | A1* | 12/2012 | Usui | .................... F02M 59/102 123/446 |
| 2017/0298886 | A1* | 10/2017 | Lee | .................... F02M 63/0054 |

FOREIGN PATENT DOCUMENTS

| | | |
|---|---|---|
| WO | 2010/049207 | 5/2010 |
| WO | 2018/164023 | 9/2018 |

OTHER PUBLICATIONS

U.S. Appl. No. 16/550,373 of Nakaoka, filed Aug. 26, 2019 (64 pages).

\* cited by examiner

PRESSURIZATION DIRECTION

COUNTER-PRESSURIZATION DIRECTION

PRESSURIZATION DIRECTION
↕
COUNTER-PRESSURIZATION DIRECTION

PRESSURIZATION
DIRECTION
↕
COUNTER-
PRESSURIZATION
DIRECTION

PRESSURIZATION
DIRECTION
↕
COUNTER-
PRESSURIZATION
DIRECTION

PRESSURIZATION DIRECTION

COUNTER-PRESSURIZATION DIRECTION

HIGH-PRESSURE PUMP

CROSS REFERENCE TO RELATED APPLICATIONS

This application is a continuation application of International Patent Application No. PCT/JP2018/008220 filed on Mar. 5, 2018, which designated the U.S. and claims the benefit of priority from Japanese Patent Application No. 2017-43212 filed on Mar. 7, 2017. The entire disclosures of all of the above applications are incorporated herein by reference.

TECHNICAL FIELD

The present disclosure relates to a high-pressure pump.

BACKGROUND

Previously, there is known a high-pressure pump that is installed to an internal combustion engine to pressurize fuel and supplies the pressurized fuel to the internal combustion engine. The high-pressure pump includes a relief valve device that releases fuel from a discharge passage when a pressure of the discharge passage becomes an abnormally high pressure.

SUMMARY

This section provides a general summary of the disclosure, and is not a comprehensive disclosure of its full scope or all of its features.

According to the present disclosure, there is provided a high-pressure pump that is configured to pressurize fuel. The high-pressure pump includes a relief valve device that is placed in a relief passage, which has one end part connected to a discharge passage in a housing while another end part of the relief passage is configured to be communicated with a suction passage in the housing. The discharge passage is configured to conduct the fuel, which is pressurized in and discharged from a pressurizing chamber. The relief valve device is configured to enable or limit a flow of the fuel between one side of the relief passage, at which the discharge passage is located, and another side of the relief passage, which is opposite to the discharge passage, at a valve opening time or a valve closing time of the relief valve device.

BRIEF DESCRIPTION OF DRAWINGS

The drawings described herein are for illustrative purposes only of selected embodiments and not all possible implementations, and are not intended to limit the scope of the present disclosure.

DETAILED DESCRIPTION

Figure 1:
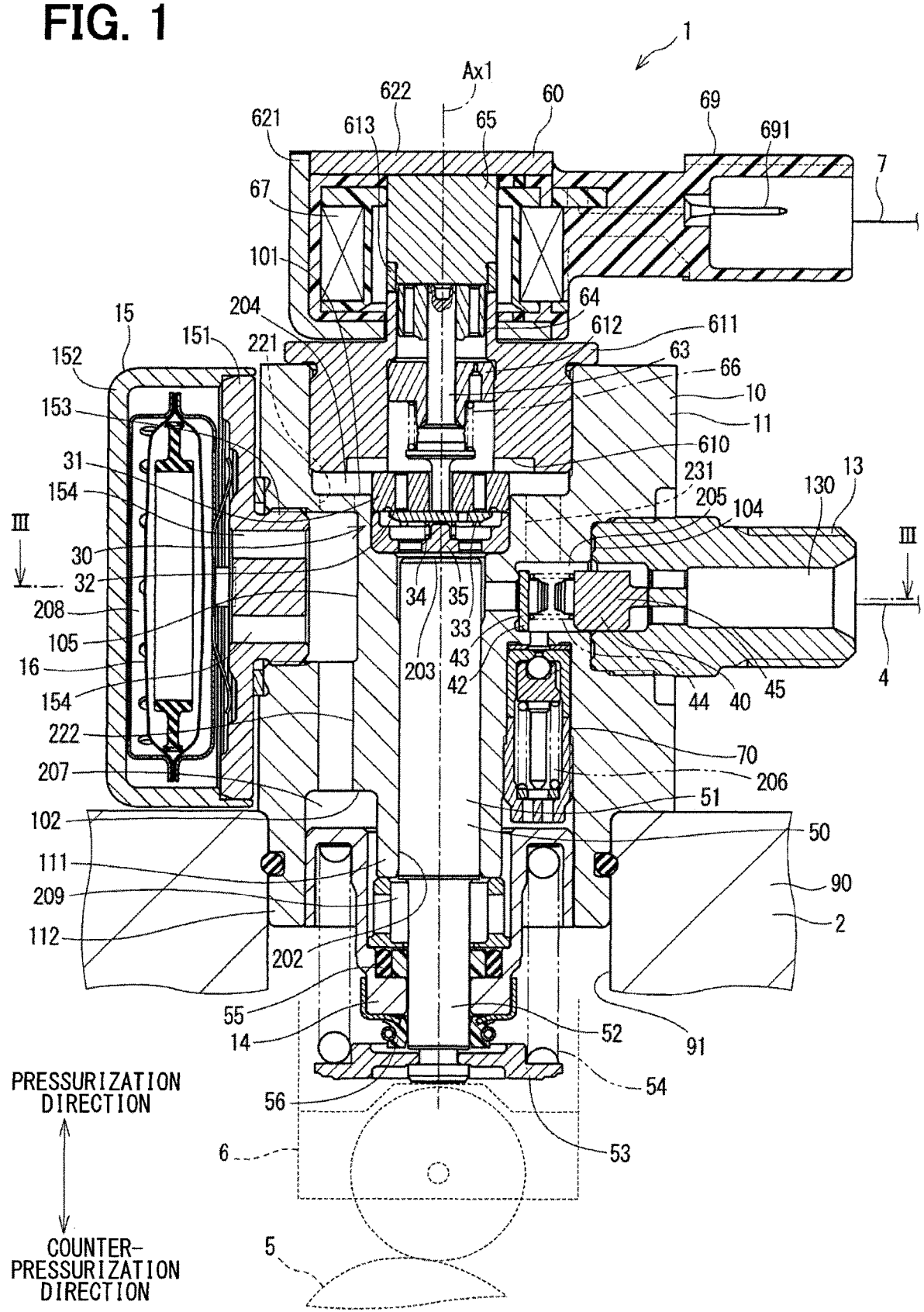
FIG. 1 is a cross-sectional view showing a high-pressure pump according to a first embodiment.

Previously, there is proposed a high-pressure pump that is installed to an internal combustion engine to pressurize fuel and supplies the pressurized fuel to the internal combustion engine. The high-pressure pump includes a relief valve device. When a pressure of a discharge passage becomes an abnormally high pressure, which is equal to or larger than a predetermined value, the relief valve device is opened to release the high pressure fuel of the discharge passage to a low pressure side. The relief valve device is placed in a relief passage that is formed at the housing.

In the above high-pressure pump, the relief passage includes a transverse passage and a longitudinal passage. The transverse passage extends from the discharge passage along a plane that is perpendicular to an axis of a plunger. The longitudinal passage extends from a distal end part of the transverse passage in a pressurization direction that is a moving direction of the plunger at a time of reducing a volume of a pressurizing chamber. The longitudinal passage is connected to a damper chamber that is located on a side of the pressurizing chamber, which is opposite to the plunger. The relief valve device is placed in the longitudinal passage of the relief passage such that a relief valve seat side of the relief valve device, i.e., an inlet side of the relief valve device faces the transverse passage side, and an outlet side of the relief valve device faces the damper chamber side. A pulsation damper, which is configured to damp a pressure pulsation of the fuel, is placed in the damper chamber. The damper chamber is communicated with the pressurizing chamber through a suction valve device.

When the fuel, which is pressurized to the high pressure and is located in the discharge passage and the transverse passage, flows into the damper chamber, which has a low pressure, through the relief valve device, the fuel is depressurized and thereby has a high temperature and a low pressure. Therefore, bubbles generated by fuel evaporation, i.e., vapor may possibly be generated in the fuel. When the vapor is suctioned into the pressurizing chamber, a vapor lock phenomenon may be generated. When the vapor lock phenomenon is generated, there is a possibility of that the high-pressure pump cannot pressurize and discharge the fuel.

In the above high-pressure pump, the relief valve device is placed in a portion of the relief passage, which is adjacent to the damper chamber. Therefore, a length of a path that connects between the relief valve device and the pressurizing chamber is relatively short. Thus, the fuel, which flows from the discharge passage and passes through the relief valve device, is suctioned into the pressurizing chamber within a relatively short time period after passing through the relief valve device. As a result, when the vapor is generated in the fuel, which has passed through the relief valve device, the vapor is suctioned into the pressurizing chamber to possibly cause the vapor lock phenomenon.

In recent years, from the viewpoint of fuel consumption and combustion improvement, the pressure of the fuel in the system, i.e., the discharge pressure of the high-pressure pump has been progressively increased. The valve opening pressure of the relief valve device is increased in response to the increase in a discharge pressure of the fuel, so that the vapor tends to be generated in the fuel that has passed through the relief valve device, and thereby the above described disadvantage becomes prominent.

According to the present disclosure, there is provided a high-pressure pump, which is configured to pressurize fuel. The high-pressure pump includes a housing, a suction valve device, a discharge valve device, a plunger and a relief valve device.

The housing includes: an inflow port that is configured to be supplied with the fuel; a plunger hole; a pressurizing chamber that is formed at one end part of the plunger hole and is configured to pressurize the fuel in the pressurizing chamber; a suction passage that is connected to the pressurizing chamber, wherein the suction passage is configured to be communicated with the inflow port and is configured to conduct the fuel to be suctioned into the pressurizing chamber; a discharge passage that is configured to conduct the fuel, which is pressurized in and discharged from the pressurizing chamber; and a relief passage that has one end part connected to the discharge passage while another end part of the relief passage is configured to be communicated with the suction passage.

The suction valve device is placed in the suction passage. The suction valve device is configured to enable or limit a flow of the fuel between one side of the suction passage, at which the pressurizing chamber is located, and another side of the suction passage, which is opposite to the pressurizing chamber, at a valve opening time or a valve closing time of the suction valve device.

The discharge valve device is placed in the discharge passage. The discharge valve device is configured to enable or limit a flow of the fuel between one side of the discharge passage, at which the pressurizing chamber is located, and another side of the discharge passage, which is opposite to the pressurizing chamber, at a valve opening time or a valve closing time of the discharge valve device.

The plunger is placed at an inside of the plunger hole such that one end part of the plunger is placed at the pressurizing chamber. The plunger is configured to reciprocate in an axial direction to increase or decrease a volume of the pressurizing chamber.

The relief valve device is placed in the relief passage. The relief valve device is configured to enable or limit a flow of the fuel between one side of the relief passage, at which the discharge passage is located, and another side of the relief passage, which is opposite to the discharge passage, at a valve opening time or a valve closing time of the relief valve device. Therefore, when the pressure of the discharge passage becomes equal to or larger than the valve opening pressure of the relief valve device, the relief valve device is opened. Thereby, the fuel, which is located on the discharge passage side of the relief valve device, flows to the opposite side of the relief valve device, which is opposite to the discharge passage. In this way, it is possible to limit the increase of the pressure of the discharge passage to the abnormally high pressure.

In the present disclosure, one end part of the relief passage is connected to the discharge passage, and another end part of the relief passage is displaced away from the one end part of the relief passage in a counter-pressurization direction that is a moving direction of the plunger at a time of increasing the volume of the pressurizing chamber, and the relief passage extends from the one end part to the another end part of the relief passage. Therefore, the fuel, which is pressurized to the high pressure and is located in the discharge passage, flows in the relief passage in the counter-pressurization direction and passes through the relief valve device. Then, the flow direction of the fuel is inverted such that the fuel flows in a pressurization direction that is a moving direction of the plunger at a time of reducing the volume of the pressurizing chamber. Thereafter, the fuel is drawn into the pressurizing chamber through the suction valve device placed in the suction passage. As discussed above, in the present disclosure, a length of the path, which connects between the relief valve device and the pressurizing chamber, is longer than that of the previously proposed technique. Therefore, even when the vapor is generated in the fuel after passing through the relief valve device, the fuel can be cooled before the fuel is drawn into the pressurizing chamber, and thereby the vapor in the fuel can be lost. In this way, it is possible to limit the suctioning of the vapor into the pressurizing chamber. Thus, the generation of the vapor lock phenomenon is limited, and thereby it is possible to limit the disablement of the pressurization and the discharge of the fuel at the high-pressure pump.

Hereinafter, a high-pressure pump of various embodiments of the present disclosure will be described with reference to the drawings. In the following embodiments, substantially identical structural portions will be indicated by the same reference signs and will not be described redundantly for the sake of simplicity. Furthermore, in the following embodiments, the substantially identical structural portions have the identical or similar effects and advantages.

First Embodiment

Figure 2:
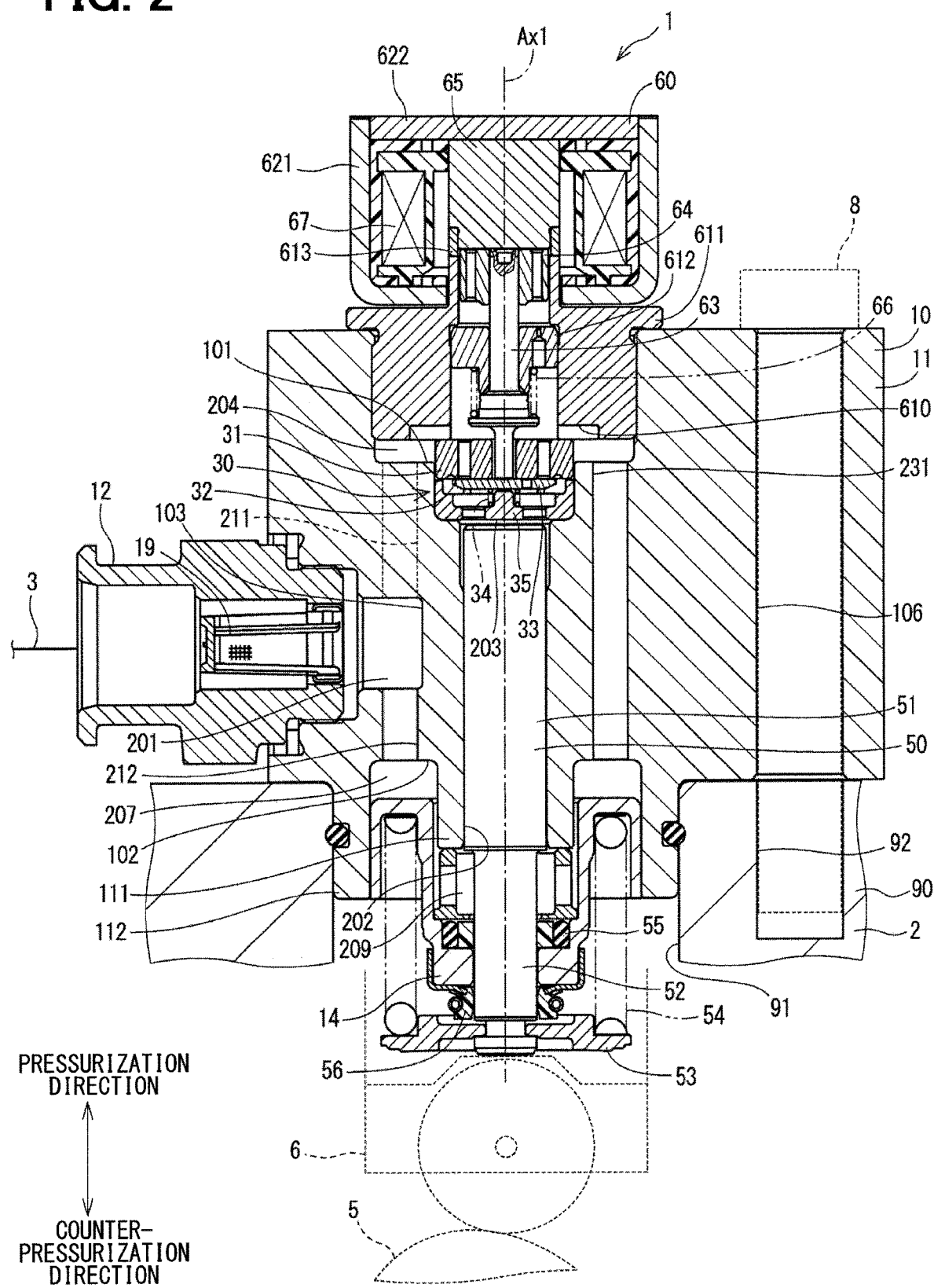
FIG. 2 is a cross-sectional view showing the high-pressure pump according to the first embodiment.
Figure 3:
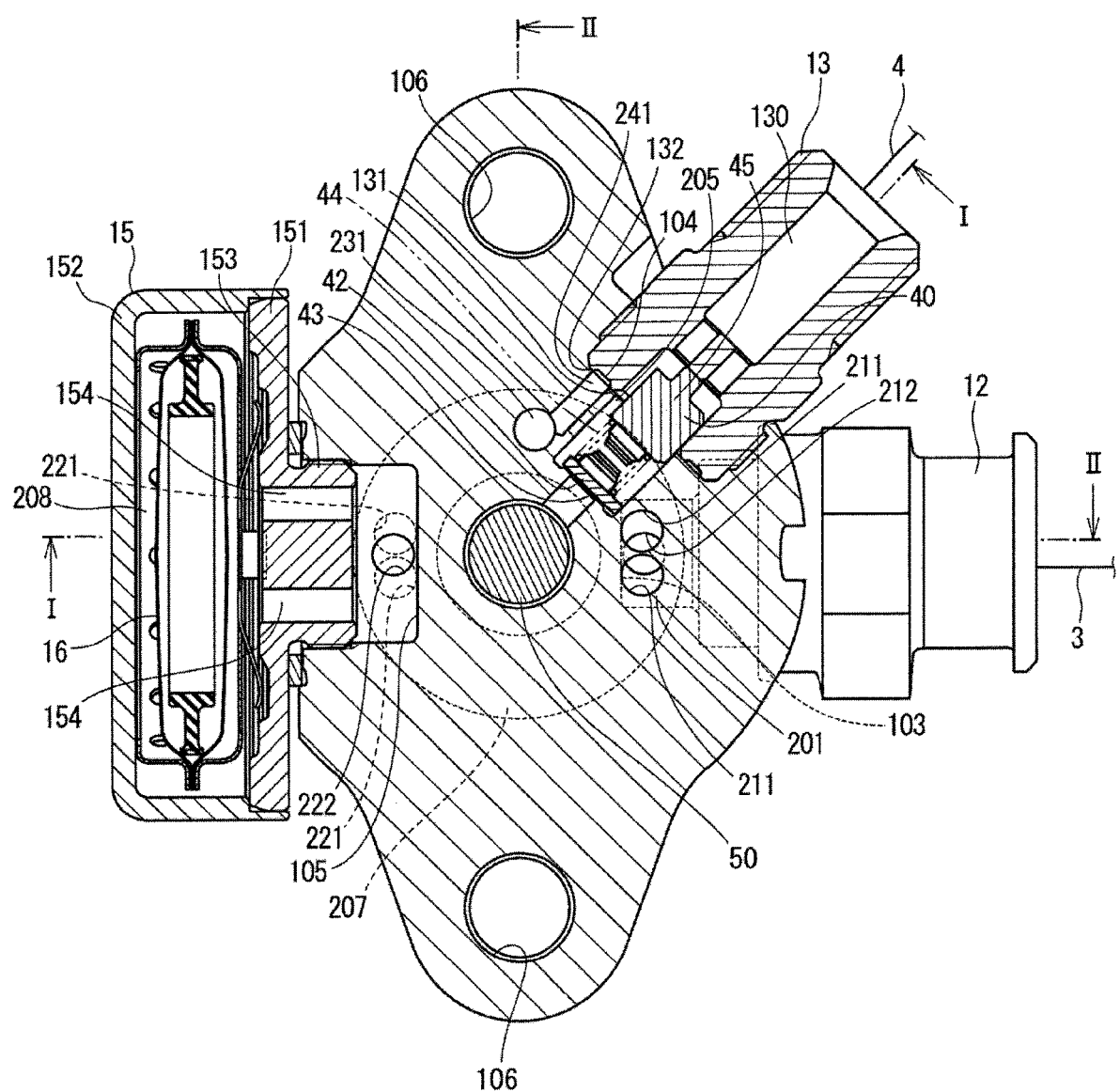
FIG. 3 is a cross-sectional view taken along line III-III in FIG. 1.

FIGS. 1 to 3 show a high-pressure pump according to a first embodiment.

The high-pressure pump 1 is installed to a vehicle (not shown). The high-pressure pump 1 is a pump that supplies fuel under a high pressure to, for example, an engine 2 that serves as an internal combustion engine. The fuel, which is supplied from the high-pressure pump 1 to the engine 2, is, for example, gasoline. Specifically, a fuel supply subject of the high-pressure pump 1 is a gasoline engine.

The fuel, which is stored in a fuel tank (not shown), is supplied to the high-pressure pump 1 by a fuel pump (not shown) through a pipe 3 (see FIGS. 2 and 3). The high-pressure pump 1 pressurizes the fuel supplied from the fuel pump and discharges the pressurized fuel to a fuel rail (not shown) through a pipe 4 (see FIGS. 1 and 3). In this way, the fuel in the fuel rail is accumulated and is injected in the engine 2 from fuel injection valves connected to the fuel rail.

As shown in FIGS. 1 to 3, the high-pressure pump 1 includes a housing 10, a pulsation damper 16, a suction valve device 30, a discharge valve device 40, a plunger 50, a spring (serving as a plunger urging member) 54, an electromagnetic drive device 60, a relief valve device 70 and a seal member 78.

The housing 10 includes a housing main body 11.

The housing main body 11 is made of metal, such as stainless steel. The housing main body 11 includes an upper recess 101, a lower recess 102, an inflow recess 103, a discharge recess 104, a damper recess 105, an extended tubular portion 111, an extended tubular portion 112, an inflow port 201, a plunger hole 202, a pressurizing chamber 203, a suction passage 204, a discharge passage 205, a relief passage 206, a fuel reservoir 207, a plurality of inflow-side upper passages 211, an inflow-side lower passage 212, a plurality of damper-side upper passages 221, a damper-side lower passage 222 and a connection passage 231.

The upper recess 101 is formed such that the upper recess 101 is in a circular form and is recessed from one end surface toward the other end surface of the housing main body 11. The lower recess 102 is formed such that the lower recess 102 is in a ring form and is recessed from the other end surface toward the one end surface of the housing main body 11. Here, the upper recess 101 and the lower recess 102 are formed to be coaxial with each other. The expression of "coaxial" should not be limited to a precisely coaxial state and may include a state where the axes are slightly deviated from each other. Furthermore, in a case where two members are placed coaxial with each other, the axes of the members may possibly deviate relative to one another depending on a state of use. This is also true in the following description.

The inflow recess 103 is formed such that the inflow recess 103 is in a circular form and is recessed from a peripheral wall of the housing main body 11, which is located between the one end surface and the other end surface of the housing main body 11, toward a center of the housing main body 11. The discharge recess 104 is formed such that the discharge recess 104 is in a circular form and is recessed from the peripheral wall of the housing main body 11, which is located between the one end surface and the other end surface of the housing main body 11, toward the center of the housing main body 11. The damper recess 105 is formed such that the damper recess 105 is in a circular form and is recessed from the peripheral wall of the housing main body 11, which is located between the one end surface and the other end surface of the housing main body 11, toward the center of the housing main body 11.

The inflow recess 103, the discharge recess 104 and the damper recess 105 are formed such that an axis of the inflow recess 103, an axis of the discharge recess 104 and an axis of the damper recess 105 are perpendicular to the axis of the upper recess 101 and of the lower recess 102. The expression of "perpendicular" should not be limited to the two straight lines precisely perpendicular to each other and may include two straight lines that are slightly non-perpendicular to each other. This is also true in the following description.

The discharge recess 104 and the damper recess 105 are located on the upper recess 101 side of the inflow recess 103 in the axial direction of the upper recess 101 (see FIGS. 1 to 3). The damper recess 105 is formed such that the axis of the damper recess 105 is parallel to the axis of the inflow recess 103. Here, the expression of "parallel" should not be limited to the two straight lines precisely parallel to each other and may include two straight lines that are slightly non-parallel to each other. This is also true in the following description.

The extended tubular portion 111 is formed such that the extended tubular portion 111 is in a substantially cylindrical tubular form and extends from the inside of the lower recess 102 at the other end surface of the housing main body 11. The extended tubular portion 112 is formed such that the extended tubular portion 112 is in a substantially cylindrical tubular form and extends from the outside of the lower recess 102 at the other end surface of the housing main body 11.

The inflow port 201 is formed at a bottom of the inflow recess 103.

The plunger hole 202 is formed such that the plunger hole 202 is in a substantially cylindrical tubular form and connects between a bottom of the upper recess 101 and the other end surface of the housing main body 11. The plunger hole 202 is formed to be coaxial with the upper recess 101 and the lower recess 102. In the present embodiment, an axial extent of the plunger hole 202, which is measured in the axial direction of the plunger 50, is equal to or larger than one half of an axial extent of the housing main body 11, which is measured in the axial direction of the plunger 50.

The pressurizing chamber 203 is formed at an end part of the plunger hole 202 located on the upper recess 101 side.

The suction passage 204 is formed at a portion of the upper recess 101, which is located on the pressurizing chamber 203 side, and the suction passage 204 is connected to the pressurizing chamber 203.

The discharge passage 205 is formed to connect between the pressurizing chamber 203 and the discharge recess 104. The discharge passage 205 is formed such that an axis of the discharge passage 205 is perpendicular to an axis Ax1 of the plunger hole 202.

The relief passage 206 is formed such that the relief passage 206 connects between the discharge passage 205 and a bottom of the lower recess 102. The relief passage 206 is formed such that an axis of the relief passage 206 is parallel to the axis Ax1 of the plunger hole 202.

The fuel reservoir 207 is formed at the lower recess 102. Specifically, the fuel reservoir 207 is shaped in a ring form. One end part of the relief passage 206 is connected to the discharge passage 205, and another end part of the relief passage 206 is connected to the fuel reservoir 207. Here, the pressurizing chamber 203 and the discharge passage 205 are located on a side of the center of the housing main body 11, which is opposite to the fuel reservoir 207 in the axial direction.

The inflow-side upper passages 211 are formed to connect between the inflow port 201 and the suction passage 204. In the present embodiment, the number of the inflow-side upper passages 211 formed at the housing main body 11 is two, and axes of these inflow-side upper passages 211 are parallel to the axis Ax1 of the plunger hole 202. In this way, the suction passage 204 is formed such that the suction passage 204 is connected to the pressurizing chamber 203 and is communicated with the inflow port 201 through the inflow-side upper passages 211.

The inflow-side lower passage 212 is formed to connect between the inflow port 201 and the fuel reservoir 207. In the present embodiment, the number of the inflow-side lower passage 212 formed at the housing main body 11 is one, and an axis of the inflow-side lower passage 212 is parallel to the axis Ax1 of the plunger hole 202.

The damper-side upper passages 221 are formed to connect between a space at an inside of the damper recess 105 and the suction passage 204. In the present embodiment, the number of the damper-side upper passages 221 formed at the housing main body 11 is two, and axes of these damper-side upper passages 221 are parallel to the axis Ax1 of the plunger hole 202.

The damper-side lower passage 222 is formed to connect between the space at the inside of the damper recess 105 and the fuel reservoir 207. In the present embodiment, the number of the damper-side lower passage 222 formed at the housing main body 11 is one, and an axis of the damper-side lower passage 222 is parallel to the axis Ax1 of the plunger hole 202.

The damper-side upper passages 221 and the damper-side lower passage 222 are formed on an opposite side of the plunger hole 202, which is opposite to the inflow-side upper passages 211 and the inflow-side lower passage 212 (see FIG. 3).

The connection passage 231 is formed to connect between the fuel reservoir 207 and the suction passage 204. In the present embodiment, the number of the connection passage 231 formed at the housing main body 11 is one, and an axis of the connection passage 231 is parallel to the axis Ax1 of the plunger hole 202. The connection passage 231 is located between the inflow recess 103 and the damper recess 105 in the circumferential direction of the plunger hole 202 and is positioned adjacent to the discharge recess 104 (see FIG. 3).

Here, one end part of the relief passage 206 is connected to the discharge passage 205, and the other end part of the relief passage 206 is communicated with the suction passage 204 through the fuel reservoir 207, the inflow-side lower passage 212, the inflow port 201, the inflow-side upper passages 211, the damper-side lower passage 222, the space at the inside of the damper recess 105, the damper-side upper passages 221 and the connection passage 231.

In the present embodiment, an inlet 12 is provided. The inlet 12 is shaped in a tubular form and is made of metal, such as stainless steel. One end part of the inlet 12 is threadably engaged with an inner wall of the inflow recess 103 of the housing main body 11. The pipe 3 is connected to the other end part of the inlet 12. Thereby, the fuel flows from the pipe 3 into the inflow port 201 through the inlet 12. A filter 19 is installed at the inside of the inlet 12. The filter 19 can capture foreign objects contained in the fuel that flows into the inflow port 201 through the inlet 12.

The fuel, which enters the inflow port 201, can flow to the suction passage 204 through the inflow-side upper passages 211. Furthermore, the fuel, which enters the inflow port 201, can flow to the fuel reservoir 207 through the inflow-side lower passage 212.

The fuel in the suction passage 204 and the fuel in the fuel reservoir 207 can flow back and forth between the suction passage 204 and the fuel reservoir 207 through the damper-side upper passages 221, the space at the inside of the damper recess 105 and the damper-side lower passage 222.

Furthermore, the fuel in the suction passage 204 and the fuel in the fuel reservoir 207 can flow back and forth between the suction passage 204 and the fuel reservoir 207 through the connection passage 231.

In the present embodiment, a discharge outlet 13 is provided. The discharge outlet 13 is shaped in a tubular form and is made of metal, such as stainless steel. An outer peripheral wall of one end part of the discharge outlet 13 is threadably engaged with the inner wall of the discharge recess 104 of the housing main body 11. A discharge passage 130 is formed at an inside of the discharge outlet 13. The discharge passage 130 is connected to the discharge passage 205. The pipe 4 is connected to the other end part of the discharge outlet 13.

In the present embodiment, a damper chamber forming portion 15 is provided. The damper chamber forming portion 15 includes a first member 151, a second member 152, a projection 153 and a plurality of holes 154. The first member 151 is shaped in a substantially circular disk form and is made of metal, such as stainless steel. The second member 152 is shaped in a bottomed cylindrical tubular form and is made of metal, such as stainless steel. The first member 151 is placed to close an opening of the second member 152. Thereby, a damper chamber 208, which is shaped in a substantially circular disk form, is formed between the first member 151 and the second member 152.

The projection 153 is formed to project from a center of the first member 151 toward a side that is opposite to the second member 152. The damper chamber forming portion 15 is formed such that the projection 153 is threadably engaged with an inner wall of the damper recess 105 of the housing main body 11. Here, the first member 151 and the second member 152 are placed such that an axis of the first member 151 and the second member 152 is perpendicular to the axis Ax1 of the plunger hole 202.

The holes 154 extend through the first member 151 and the projection 153. The holes 154 connect between the damper chamber 208 and the space at the inside of the damper recess 105.

The pulsation damper 16 is placed at the damper chamber 208. For example, the pulsation damper 16 is formed such that outer peripheral edges of two diaphragms are joined together to form a hollow circular disk form, and a gas of a predetermined pressure is sealed at the inside of the pulsation damper 16. Here, the pulsation damper 16 is placed at the damper chamber 208 such that an axis of the pulsation damper 16 is perpendicular to the axis Ax1 of the plunger hole 202.

The pulsation damper 16 is resiliently deformed according to a change in a pressure at the inside of the damper chamber 208. Thereby, the pressure pulsation at the inside of the damper chamber 208 can be reduced.

The suction valve device 30 is placed in the suction passage 204.

The suction valve device 30 includes a suction valve seat element 31, a suction valve seat 32, a suction valve 33, a spring 34, a stopper 35 and a pressing portion 36.

The suction valve seat element 31 is shaped in a substantially cylindrical tubular form and is made of metal, such as stainless steel. The suction valve seat element 31 is placed at the suction passage 204 such that the suction valve seat element 31 is coaxial with the plunger hole 202. The suction valve seat element 31 includes a plurality of holes that are placed on a radially outer side of a center hole and connect between one end surface and the other end surface of the suction valve seat element 31. The suction valve seat 32 is formed around the above-described holes at the end surface of the suction valve seat element 31 located on the pressurizing chamber 203 side.

The suction valve 33 is shaped in a substantially circular disk form and is made of metal, such as stainless steel.

The stopper 35 is shaped in a substantially circular disk form and is made of metal, such as stainless steel. The stopper 35 is placed on the pressurizing chamber 203 side of the suction valve 33 such that an outer periphery of the stopper 35 is fitted to an inner wall of the upper recess 101 of the housing main body 11. Here, an outer periphery of the surface of the stopper 35, which is located on the pressurizing chamber 203 side, contacts the bottom of the upper recess 101. Furthermore, an outer periphery of an opposite side of the stopper 35, which is opposite to the pressurizing chamber 203, contacts an outer periphery of the suction valve seat element 31. The stopper 35 includes a plurality of holes that connect between one surface and an opposite surface of the stopper 35.

The suction valve 33 is configured to reciprocate between the suction valve seat element 31 and the stopper 35. One end surface of the suction valve 33 is configured to contact the suction valve seat 32. The suction valve 33 opens or closes the suction passage 204 when the suction valve 33 is spaced away from or contacts the suction valve seat 32. Specifically, the suction valve device 30 is configured to enable or limit a flow of the fuel between the pressurizing chamber 203 side of the suction passage 204 and the opposite side of the suction passage 204, which is opposite to the pressurizing chamber 203, at the valve opening time or the valve closing time of the suction valve device 30. Here, in order to limit wearing, a thin film coating, such as DLC (diamond like carbon), may be applied to at least one of: a contact area of the suction valve 33, which is configured to contact the suction valve seat 32; and a contact area of the suction valve seat 32, which is configured to contact the suction valve 33.

The other end surface of the suction valve 33 is configured to contact the stopper 35. When the suction valve 33 contacts the stopper 35, the stopper 35 limits movement of the suction valve 33 toward the pressurizing chamber 203.

The suction valve seat element 31 and the stopper 35 are fixed such that the suction valve seat element 31 and the stopper 35 are clamped between the support 611 of the electromagnetic drive device 60 and the housing main body 11 as described later.

The spring 34 is, for example, a coil spring and is placed between the suction valve 33 and the stopper 35. The spring 34 urges the suction valve 33 toward the suction valve seat 32.

The discharge valve device 40 is placed in the discharge passage 205 and the discharge passage 130.

The discharge valve device 40 includes a discharge valve seat 42, a discharge valve 43, a spring 44 and a stopper 45.

The discharge valve seat 42 is formed at the inner wall of the housing main body 11, which forms the discharge passage 205.

The discharge valve 43 is shaped in a substantially circular disk form and is made of metal, such as stainless steel. The discharge valve 43 is configured to reciprocate on a side of the discharge valve seat 42, which is opposite to the pressurizing chamber 203. One end surface of the discharge valve 43 is configured to contact the discharge valve seat 42. The discharge valve 43 opens or closes the discharge passage 205 when the discharge valve 43 is spaced away from or contacts the discharge valve seat 42. Specifically, the discharge valve device 40 is configured to enable or limit a flow of the fuel between the pressurizing chamber 203 side of the discharge passage 205 and the opposite side of the discharge passage 205, which is opposite to the pressurizing chamber 203, at a valve opening time or a valve closing time of the discharge valve device 40. Here, in order to limit wearing, a thin film coating, such as the DLC, may be applied to at least one of: a contact area of the discharge valve 43, which is configured to contact the discharge valve seat 42; and a contact area of the discharge valve seat 42, which is configured to contact the discharge valve 43.

The stopper 45 is placed at an end part of the discharge outlet 13, which is located on the pressurizing chamber 203 side, such that the stopper 45 is fitted to an inner peripheral wall of the discharge outlet 13 through an outer peripheral wall of the stopper 45.

An end surface of the discharge valve 43, which is opposite to the pressurizing chamber 203, is configured to contact the stopper 45. When the discharge valve 43 contacts the stopper 45, the stopper 45 limits movement of the discharge valve 43 toward the side that is opposite to the pressurizing chamber 203.

The spring 44 is, for example, a coil spring and is placed between the discharge valve 43 and the stopper 45. The spring 44 urges the discharge valve 43 toward the discharge valve seat 42. Thereby, the discharge valve 43 is urged against the discharge valve seat 42.

When a pressure of the fuel in the space located on the pressurizing chamber 203 side of the discharge valve seat 42 becomes larger than a sum (a valve opening pressure of the discharge valve device 40) of the pressure of the fuel in the space located on the pipe 4 side of the discharge valve seat 42 and the urging force of the spring 44, the discharge valve 43 is moved away from the discharge valve seat 42 and is thereby opened. In this way, the fuel on the pressurizing chamber 203 side of the discharge valve seat 42 is discharged toward the pipe 4 through the discharge valve seat 42. A valve opening pressure of the discharge valve device 40 can be set by adjusting the urging force of the spring 44.

The plunger 50 is placed at the plunger hole 202 of the housing main body 11. The plunger 50 is shaped in a substantially cylindrical rod form and is made of metal, such as stainless steel. The plunger 50 includes a large diameter portion 51 and a small diameter portion 52. An outer diameter of the small diameter portion 52 is smaller than an outer diameter of the large diameter portion 51. The large diameter portion 51 and the small diameter portion 52 are coaxial with each other and are formed integrally in one piece. The plunger 50 is placed in the plunger hole 202 such that one end part of the plunger 50, i.e., an end part of the large diameter portion 51 is placed in the pressurizing chamber 203. The plunger 50 is configured to reciprocate in the axial direction to increase and decrease a volume of the pressurizing chamber 203.

The outer diameter of the large diameter portion 51 of the plunger 50 is substantially equal to or slightly smaller than an inner diameter of the plunger hole 202. Thereby, an outer peripheral wall of the large diameter portion 51 is slidable along the inner peripheral wall of the plunger hole 202, and thereby the plunger 50 is supported by the plunger hole 202 in a manner that enables reciprocation of the plunger 50 in the axial direction.

When the plunger 50 is moved to increase the volume of the pressurizing chamber 203, the suction valve device 30 is opened, and the fuel is drawn into the pressurizing chamber 203 through the suction valve device 30. In contrast, when the plunger 50 is moved to decrease the volume of the pressurizing chamber 203, the suction valve device 30 is closed, and the fuel in the pressurizing chamber 203 is pressurized.

Hereinafter, a moving direction of the plunger 50 at a time of decreasing the volume of the pressurizing chamber 203 will be referred to as a pressurization direction, and a moving direction of the plunger 50 at a time of increasing the volume of the pressurizing chamber 203 will be referred to as a counter-pressurization direction.

In the present embodiment, a seat upper 14 is provided. The seat upper 14 is shaped in a tubular form and is made of metal, such as stainless steel. The seat upper 14 is placed on the radially outer side of the plunger 50 and the extended tubular portion 111 and is fitted to the inner wall of the extended tubular portion 112 through an outer peripheral wall of the seat upper 14. The seat upper 14 forms the fuel reservoir 207 between the seat upper 14 and the lower recess 102 of the housing main body 11. Specifically, the fuel reservoir 207 is formed on the radially outer side of the plunger 50.

The seat upper 14 is installed such that a clearance in a substantially cylindrical tubular form is formed between: an inner peripheral wall of the seat upper 14; and an outer peripheral wall of the extended tubular portion 111 and an outer peripheral wall of the small diameter portion 52. A seal 55, which is in an annular form, is placed between the inner peripheral wall of the seat upper 14 and the outer peripheral wall of the small diameter portion 52 of the plunger 50. The seal 55 includes a radially inner ring made of fluorine resin and a radially outer ring made of rubber. A thickness of a fuel oil film, which is formed around the small diameter portion 52 of the plunger 50, is adjusted by the seal 55, so that leakage of the fuel to the engine 2 is limited. Furthermore, an oil seal 56 is placed at an end part of the seat upper 14, which is opposite to the pressurizing chamber 203. The oil seal 56 adjusts a thickness of an oil film, which is formed around the small diameter portion 52 of the plunger 50, so that intrusion of the oil into the high-pressure pump 1 is limited.

A variable volume chamber 209, a volume of which changes at the time of reciprocation of the plunger 50, is formed between the seal 55 and a step surface while the step surface is formed between the large diameter portion 51 and the small diameter portion 52 of the plunger 50.

The variable volume chamber 209 is connected to the fuel reservoir 207 through a space between the inner peripheral wall of the seat upper 14 and the outer peripheral wall of the extended tubular portion 111.

A spring seat 53, which is shaped in a substantially circular disk form, is installed to an end part of the small diameter portion 52 of the plunger 50, which is opposite to the large diameter portion 51.

The spring 54 is placed between the spring seat 53 and the seat upper 14. The spring 54 is, for example, a coil spring. One end part of the spring 54 is connected to the plunger 50 through the spring seat 53, and the other end part of the spring 54 contacts the seat upper 14. The spring 54 urges the plunger 50 through the spring seat 53 toward the side, which is opposite to the pressurizing chamber 203, i.e., in the counter-pressurization direction.

When the high-pressure pump 1 is installed to the engine 2, a lifter 6 is installed to the end part of the small diameter portion 52 of the plunger 50, which is opposite to the large diameter portion 51.

In the state where the high-pressure pump 1 is installed to the engine 2, the lifter 6 contacts a cam 5 of the cam shaft, which is rotated synchronously with a drive shaft of the engine 2. Thereby, when the engine 2 is rotated, the plunger 50 is reciprocated in the axial direction through the rotation of the cam 5. At this time, the volume of the pressurizing chamber 203 and the volume of the variable volume chamber 209 are periodically changed.

The electromagnetic drive device 60 is placed on the opposite side of the suction valve device 30, which is opposite to the plunger 50. The electromagnetic drive device 60 includes supports 611, 612, a tubular member 613, yokes 621, 622, a needle 63, a movable core 64, a stationary core 65, a spring 66, a coil 67 and a connector 69.

The support 611 is shaped in a substantially cylindrical tubular form and is made of, for example, a magnetic material. The support 611 is installed to the housing main body 11 such that one end part of the support 611 is threadably engaged with an inner wall of the upper recess 101 of the housing main body 11. Specifically, the support 611 is installed to an opening of the upper recess 101 of the housing main body 11 such that the support 611 is coaxial with the plunger hole 202. An end surface of the support 611, which is located on the pressurizing chamber 203 side, contacts an end surface of the suction valve seat element 31, which is opposite to the pressurizing chamber 203. The support 611 urges the stopper 35 against the bottom of the upper recess 101 of the housing main body 11 through the suction valve seat element 31. Specifically, the support 611 fixes the suction valve seat element 31 and the stopper 35 such that the suction valve seat element 31 and the stopper 35 are clamped between the support 611 and the housing main body 11. A plurality of grooves 610 is formed at an inner periphery of an end surface of the support 611 located on the suction valve seat element 31 side. Therefore, at the suction passage 204, the fuel, which is located on the suction valve seat element 31 side of the support 611, can flow into a space at the inside of the support 611 through the grooves 610.

The support 612 is shaped in a substantially cylindrical tubular form and is made of, for example, a non-magnetic material. The support 612 is formed coaxial with the support 611 such that an outer peripheral wall of the support 612 is fitted to an inner peripheral wall of and end part of the support 611, which is located on the pressurizing chamber 203 side.

The tubular member 613 is shaped in a substantially cylindrical tubular form and is made of, for example, a non-magnetic material. The tubular member 613 is placed on a side of the support 611, which is opposite to the pressurizing chamber 203, such that the tubular member 613 is coaxial with the support 611.

The yoke 621 is shaped in a bottomed cylindrical tubular form and is made of, for example, a magnetic material. The yoke 621 has a hole at a center of a bottom of the yoke 621. The yoke 621 is placed on a side of the support 611, which is opposite to the pressurizing chamber 203, such that the support 611 is placed at the inside of the hole of the yoke 621. The yoke 621 is coaxial with the support 611.

The yoke 622 is shaped in a substantially circular disk form and is made of, for example, a magnetic material. The yoke 622 is installed to the yoke 621 such that the yoke 622 closes an opening of the yoke 621.

The needle 63 is shaped in a rod form and is made of, for example, metal. The needle 63 is supported by a center hole of the support 612 in a manner that enables reciprocation of the needle 63. One end part of the needle 63 is inserted through a center hole of the suction valve seat element 31 and is configured to contact the end surface of the suction valve 33 that is opposite to the pressurizing chamber 203. The needle 63 is coaxial with the plunger hole 202.

The movable core 64 is shaped in a substantially cylindrical tubular form and is made of, for example, a magnetic material. The movable core 64 is installed to the other end part of the needle 63.

The stationary core 65 is made of, for example, a magnetic material and is placed on a side of the tubular member 613, which is opposite to the support 611.

The spring 66 is, for example, a coil spring and is placed between an annular projection of the needle 63, which radially outwardly projects from an outer peripheral wall of the needle 63, and the support 612. The spring 66 urges the needle 63 toward the pressurizing chamber 203 side. An urging force of the spring 66 is set to be larger than an urging force of the spring 34. Therefore, the suction valve 33 is spaced from the suction valve seat 32. A center of an end surface of the suction valve 33, which is located on the pressurizing chamber 203 side, contacts a projection that projects from a center of the stopper 35. The needle 63 and the movable core 64 are spaced from the stationary core 65.

The coil 67 is formed into a substantially cylindrical tubular form by winding an electrically conductive wire material. The coil 67 is placed at the inside of the yoke 621 and the yoke 622 such that the coil 67 is on the radially outer side of the tubular member 613 and the stationary core 65. The coil 67 is coaxial with the yoke 621.

The connector 69 extends from an opening formed at a portion of the yoke 621 toward the radially outer side of the yoke 621. The connector 69 includes terminals 691. Each of the terminals 691 is shaped in a rod form and is made of an electrically conductive material. One end of each terminal 691 is electrically connected to the coil 67. A harness 7 is connected to the connector 69. In this way, an electric power is supplied to the coil 67 through the harness 7 and the terminals 691.

When the electric power is supplied to the coil 67, a magnetic circuit is formed through the support 611, the yokes 621, 622, the stationary core 65 and the movable core 64 while bypassing the tubular member 613. Thus, the movable core 64 is magnetically attracted to the stationary core 65 together with the needle 63. Therefore, the suction valve 33 is moved toward the suction valve seat 32 by the urging force of the spring 34 and contacts the suction valve seat 32, so that the suction valve 33 is closed.

When the supply of the electric power to the coil 67 is stopped, the magnetic circuit is lost. Thereby, the movable core 64 is moved together with the needle 63 by the urging force of the spring 66 toward the pressurizing chamber 203. Therefore, the suction valve 33 is urged by the needle 63 toward the pressurizing chamber 203 and is thereby spaced away from the suction valve seat 32, so that the suction valve 33 is opened.

As described above, when the electric power is supplied to the electromagnetic drive device 60, the electromagnetic drive device 60 can drive the suction valve 33 of the suction valve device 30 such that the suction valve device 30 is closed. In the present embodiment, the electromagnetic drive device 60 and the suction valve device 30 form a normally open type valve device where the suction valve device 30 is opened at the time of stopping the supply of the electric power to the electromagnetic drive device 60, and the suction valve device 30 is closed at the time of supplying the electric power to the electromagnetic drive device 60.

As shown in FIGS. 2 and 3, a plurality of insertion holes 106 is formed at the housing main body 11. Each of the insertion holes 106 is formed such that the insertion hole 106 connects between the one end surface and the other end surface of the housing main body 11. An axis of each insertion hole 106 is parallel to the axis Ax1 of the plunger hole 202. The number of the insertion holes 106 is two, and these insertion holes 106 are formed such that the plunger hole 202 is placed between the insertion holes 106. Specifically, the two insertion holes 106 are arranged one after the other in the circumferential direction of the plunger hole 202 at 180 degree intervals (see FIG. 3).

In the present embodiment, the housing main body 11 is fixed to an engine head 90 of the engine 2 by bolts 8, which are provided to correspond with the insertion holes 106.

An installation hole 91 and fixation holes 92 are formed at the engine head 90.

The high-pressure pump 1 is installed to the engine 2 such that the outer peripheral wall of the extended tubular portion 112 of the housing main body 11 is fitted to an inner peripheral wall of the installation hole 91. Specifically, the housing 10 is installed to the engine 2 such that the side of the plunger hole 202, which is opposite to the pressurizing chamber 203, faces the engine 2.

The bolts 8 are respectively inserted through the insertion holes 106, and one end part of each bolt 8 is threadably engaged into a corresponding one of the fixation holes 92 of the engine head 90, so that the housing main body 11 is securely held between heads of the other end parts of the bolts 8 and the engine head 90 (see FIG. 2). In this way, the high-pressure pump 1 can be fixed to the engine 2.

The relief valve device 70 is placed at the relief passage 206.

Figure 4A:
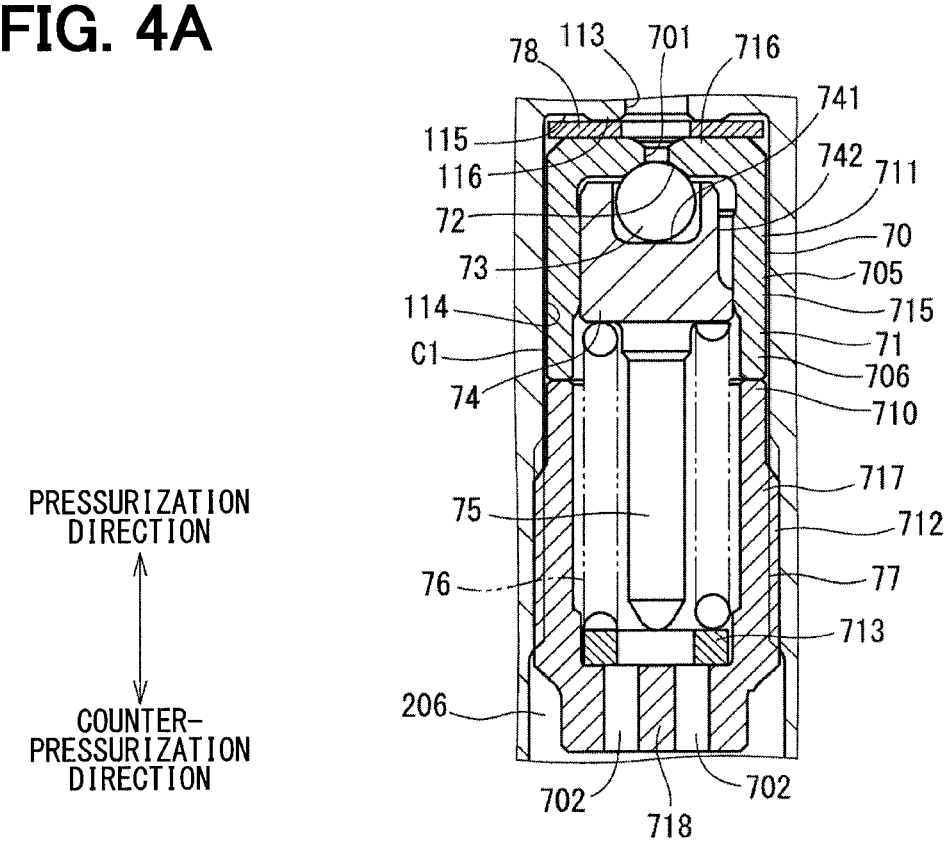
FIG. 4A is a cross-sectional view showing a relief valve device of the high-pressure pump in a valve closing state according to the first embodiment.

The relief passage 206 extends from the discharge passage 205 in the counter-pressurization direction and is connected to the fuel reservoir 207 (see FIG. 1). The relief passage 206 includes a small diameter region 113, a large diameter region 114, a step surface 115 and a projection 116 (see FIGS. 4A and 4B).

The small diameter region 113 is formed at the side of the relief passage 206 where the discharge passage 205 is placed, and the small diameter region 113 is connected to the discharge passage 205. The large diameter region 114 is formed on a side of the small diameter region 113 of the relief passage 206, which is opposite to the discharge passage 205, and the large diameter region 114 is connected to the fuel reservoir 207. An inner diameter of the large diameter region 114 is larger than an inner diameter of the small diameter region 113.

The step surface 115 is located between the small diameter region 113 and the large diameter region 114 and is shaped in an annular planar form. The projection 116 is shaped in an ring form and projects from an inner periphery of the step surface 115 toward the fuel reservoir 207.

The relief valve device 70 includes a relief tubular member 71, a relief valve 73, a holder 74, a protrusion 75 and a spring 76.

The relief tubular member 71 includes a first tubular member 711, a second tubular member 712 and a spacer 713.

The first tubular member 711 is made of, for example, metal. The first tubular member 711 includes a tubular portion 715 and a bottom 716. The tubular portion 715 is shaped in a substantially cylindrical tubular form. The bottom 716 is formed integrally with the tubular portion 715 in one piece such that the bottom 716 closes one end part of the tubular portion 715. Specifically, the first tubular member 711 is shaped in a bottomed cylindrical tubular form.

The first tubular member 711 has an inlet hole 701 that extends through a center of the bottom 716. Furthermore, the first tubular member 711 has a relief valve seat 72 that is formed around the inlet hole 701 at a surface of the bottom 716, which is located on the tubular portion 715 side. The relief valve seat 72 is tapered such that the relief valve seat 72 progressively approaches a central axis of the tubular portion 715 from the surface of the bottom 716, which is located on the tubular portion 715 side, toward an opposite side of the bottom 716, which is opposite to the tubular portion 715.

Furthermore, the tubular portion 715 includes a small-diameter tubular segment 705 and a large-diameter tubular segment 706. The small-diameter tubular segment 705 is formed at the bottom 716 side of the tubular portion 715. The large-diameter tubular segment 706 is formed on an opposite side of the small-diameter tubular segment 705, which is opposite to the bottom 716. The small-diameter tubular segment 705 and the large-diameter tubular segment 706 are coaxial with each other. An inner diameter of the small-diameter tubular segment 705 is smaller than an inner diameter of the large-diameter tubular segment 706.

The second tubular member 712 is made of, for example, metal. A hardness of the second tubular member 712 is lower than a hardness of the first tubular member 711. The second tubular member 712 includes a tubular portion 717 and a bottom 718. The tubular portion 717 is shaped in a substantially cylindrical tubular form. The bottom 718 is formed integrally with the tubular portion 717 in one piece such that the bottom 718 closes one end part of the tubular portion 717. Specifically, the second tubular member 712 is shaped in a bottomed cylindrical tubular form.

At the second tubular member 712, a threaded part 77 is formed at an outer peripheral wall of a part of the tubular portion 717, which is located on the bottom 718 side.

Furthermore, the second tubular member 712 has a plurality of outlet holes 702 that extend through the bottom 718.

An end part of the tubular portion 717 of the second tubular member 712, which is opposite to the bottom 718, contacts an end part of the tubular portion 715 of the first tubular member 711, which is opposite to the bottom 716. The tubular portion 715 of the first tubular member 711 and the tubular portion 717 of the second tubular member 712 are coaxial with each other and are fixed together by, for example, welding to limit relative movement therebetween. A plurality of fused parts 710 is formed at a contact between the tubular portion 715 and the tubular portion 717. The fused parts 710 are parts of the contact between the tubular portion 715 and the tubular portion 717, which are fused at the time of welding the tubular portion 715 and the tubular portion 717 together and then solidified upon cooling. In the present embodiment, the fused parts 710 are arranged at equal intervals in a circumferential direction of the tubular portion 715 and the tubular portion 717.

An inner diameter of the tubular portion 717 of the second tubular member 712 is equal to an inner diameter of the large-diameter tubular segment 706 of the first tubular member 711.

The spacer 713 is shaped in a substantially annular ring form and is made of, for example, metal. The spacer 713 is placed at an inside of the second tubular member 712 such that one end surface of the spacer 713 contacts the bottom 718. Here, the outlet holes 702 are communicated with a space at an inside of the spacer 713.

The relief valve 73 is shaped in a spherical form and is made of, for example, metal. A hardness of the relief valve 73 is substantially equal to a hardness of the first tubular member 711. The relief valve 73 is configured to contact the relief valve seat 72 at an inside of the first tubular member 711. When the relief valve 73 is spaced away from the relief valve seat 72, the relief valve device 70 is opened. When the relief valve 73 contacts the relief valve seat 72, the relief valve device 70 is closed. Here, in order to limit wearing, a thin film coating, such as the DLC, may be applied to at least one of: a contact area of the relief valve 73, which is configured to contact the relief valve seat 72; and a contact area of the relief valve seat 72, which is configured to contact the relief valve 73.

Hereinafter, a direction of moving the relief valve 73 away from the relief valve seat 72 will be referred to as a valve opening direction. Also, a direction of moving the relief valve 73 toward the relief valve seat 72 to contact the relief valve seat 72 will be referred to as a valve closing direction.

The holder 74 is shaped in a substantially cylindrical rod form and is made of, for example, metal. The holder 74 is configured to reciprocate in an axial direction at the inside of the first tubular member 711. The holder 74 is slidable along an inner peripheral wall of the small-diameter tubular segment 705 of the first tubular member 711 through an outer peripheral wall of the holder 74.

The holder 74 includes a receiving recess 741 and a cutout 742. The receiving recess 741 is recessed from an end surface of the holder 74, which is located on the bottom 716 side, toward the bottom 718. A portion of the relief valve 73 is received in the receiving recess 741. Here, a depth of the receiving recess 741 is set to be larger than a lift amount of the relief valve 73 to limit radial deviation of the position of the relief valve 73 at the valve opening time of the relief valve 73.

The cutout 742 is formed by cutting a circumferential portion of the outer periphery of the holder 74. The cutout 742 is formed to extend from the end surface of the holder 74, which is located on the bottom 716 side, toward the bottom 718. A distal end part of the cutout 742, which is located on the bottom 718 side, is placed on the bottom 716 side of an end surface of the holder 74, which is located on the bottom 718 side (see FIGS. 4A and 4B). Furthermore, in a state where the relief valve 73 contacts the relief valve seat 72, and a bottom of the receiving recess 741 of the holder 74 contacts the relief valve 73, a distal end part of the cutout 742, which is located on the bottom 718 side, is placed on the bottom 716 side of an end part of the small-diameter tubular segment 705, which is located on the bottom 718 side (see FIG. 4A). In contrast, in a state where the relief valve 73 and the holder 74 are respectively spaced from the bottom 716 by a predetermined distance, the distal end part of the cutout 742, which is located on the bottom 718 side, is placed on the bottom 718 side of the end part of the small-diameter tubular segment 705, which is located on the bottom 718 side (see FIG. 4B). In this way, a flow passage r1 is formed between: the outer peripheral wall of the cutout 742 and of the holder 74; and the inner peripheral wall of the small-diameter tubular segment 705 and of the large-diameter tubular segment 706.

The protrusion 75 is formed integrally with the holder 74 in one piece such that the protrusion 75 is shaped in a substantially cylindrical rod form and protrudes from a center of the end surface of the holder 74, which is located on the bottom 718 side, toward the bottom 718. In a state where the relief valve 73 and the holder 74 are respectively spaced by the predetermined distance from the bottom 716, a distal end part of the protrusion 75 contacts the bottom 718 of the second tubular member 712 (see FIG. 4B). When the protrusion 75 contacts the bottom 718, movement of the relief valve 73 and the holder 74 in the valve opening direction is limited.

The spring 76 is, for example, a coil spring. The spring 76 is placed between the holder 74 and the spacer 713 at the inside of the second tubular member 712. The spring 76 urges the holder 74 toward the relief valve seat 72. Thereby, the relief valve 73 is urged against the relief valve seat 72. Furthermore, the spacer 713 is urged against the bottom 718.

As discussed above, the first tubular member 711 and the second tubular member 712 are fixed to each other so that the relative movement between the first tubular member 711 and the second tubular member 712 is limited. Specifically, the relief valve device 70 is formed as an assembly.

The relief valve device 70 is placed at an inside of the large diameter region 114 of the relief passage 206 such that a side of the relief valve device 70, which is located on the first tubular member 711 side, faces the discharge passage 205. The threaded part 77 of the second tubular member 712 is threadably engaged with an inner peripheral wall of the large diameter region 114 of the housing main body 11. An outer diameter of the tubular portion 715 of the first tubular member 711 and an outer diameter of an unthreaded part of the tubular portion 717 of the second tubular member 712, which is other than the threaded part 77, are smaller than an inner diameter of the large diameter region 114 of the relief passage 206. Therefore, a clearance c1, which is shaped in an annular form, is formed between: an inner peripheral wall of the large diameter region 114 of the housing main body 11; and an outer peripheral wall of the tubular portion 715 and an outer peripheral wall of the unthreaded part of the tubular portion 717, which is other than the threaded part 77.

The seal member 78 is shaped in a substantially annular ring form and is made of, for example, metal. A hardness of the seal member 78 is lower than a hardness of the first tubular member 711 and a hardness of the housing main body 11. The seal member 78 is placed between the step surface 115 of the relief passage 206 and the first tubular member 711 of the relief valve device 70. An inner periphery of one end surface of the seal member 78 contacts the projection 116 of the relief passage 206, and the other end surface of the seal member 78 contacts an end surface of the bottom 716 of the first tubular member 711, which is opposite to the tubular portion 715. Therefore, the discharge passage 205 is communicated with the inlet hole 701 of the relief valve device 70 through the small diameter region 113 and the inside of the seal member 78.

In the present embodiment, in a manufacturing process of the high-pressure pump 1, the relief valve device 70 is inserted into the relief passage 206 in a state where the relief valve device 70 is formed as the assembly. Thereafter, a jig is coupled to an outer periphery of the bottom 718 of the second tubular member 712, and then the jig is rotated. In this way, the threaded part 77 of the relief valve device 70 is threadably engaged with the inner peripheral wall of the large diameter region 114 of the housing main body 11. At this time, an axial force is applied from the projection 116 of the relief passage 206 and the bottom 716 of the relief valve device 70 to the seal member 78. Thereby, the seal member 78 is compressed in the axial direction between the projection 116 and the bottom 716. Thus, the fluid tightness is maintained between the bottom 716 of the first tubular member 711 and the projection 116 of the relief passage 206. Specifically, the seal member 78 is placed such that the seal member 78 can maintain the fluid tightness between the relief tubular member 71 and the housing main body 11.

When a pressure of the fuel in the space located on the discharge passage 205 side of the relief valve seat 72 becomes larger than a sum (a valve opening pressure of the relief valve device 70) of the pressure of the fuel in the space located on the opposite side of the relief valve seat 72, which is opposite to the discharge passage 205, and the urging force of the spring 76, the relief valve 73 is moved away from the relief valve seat 72 and is thereby opened. In this way, the fuel on the discharge passage 205 side of the relief valve seat 72 flows to the opposite side of the relief valve seat 72, which is opposite to the discharge passage 205. The valve opening pressure of the relief valve device 70 can be set by adjusting the urging force of the spring 76 and a thickness of the spacer 713.

The relief valve device 70 enables or limits the flow of the fuel between the discharge passage 205 side of the relief passage 206 and the other side of the relief passage 206, which is opposite to the discharge passage 205, at the valve opening time or the valve closing time of the relief valve device 70.

In the present embodiment, the housing main body 11 further includes a communication passage 241. The communication passage 241 is formed to connect between a space at an inside of the discharge recess 104 and the connection passage 231 (see FIG. 3).

The discharge outlet 13 further includes an inner projection 131 and an outer projection 132. The inner projection 131 is shaped in a ring form and projects from an inner periphery of an end surface of the discharge outlet 13, which is located on the pressurizing chamber 203 side, toward the pressurizing chamber 203. The outer projection 132 is shaped in a ring form and projects from an outer periphery of the end surface of the discharge outlet 13, which is located on the pressurizing chamber 203 side, toward the pressurizing chamber 203.

The discharge outlet 13 is threadably engaged with the housing main body 11 such that the inner projection 131 and the outer projection 132 are urged against a bottom of the discharge recess 104 of the housing main body 11. Thereby, the fluid tightness is maintained between the discharge outlet 13 and the inner wall of the housing main body 11.

Here, an end part of the communication passage 241, which is opposite to the connection passage 231, opens between the inner projection 131 and the outer projection 132. Therefore, even if the pressure of the fuel in the discharge passage 205 and the discharge passage 130 becomes high and thereby leaks to a space between the inner projection 131 and the outer projection 132 through the location between the bottom of the discharge recess 104 of the housing main body 11 and the inner projection 131, the leaked fuel can be released to the connection passage 231, which has the low pressure, through the communication passage 241. In this way, it is possible to limit the leakage of the fuel, which is in the discharge passage 205 and the discharge passage 130, to the outside of the housing main body 11 through a location between the bottom of the discharge recess 104 of the housing main body 11 and the outer projection 132 and a location between the inner peripheral wall of the discharge recess 104 of the housing main body 11 and the outer peripheral wall of the discharge outlet 13.

Next, an operation of the high-pressure pump 1 will be described with reference to FIGS. 1 to 3.

(Suction Stroke)

In a state where the supply of the electric power to the coil 67 of the electromagnetic drive device 60 is stopped, the suction valve 33 is urged toward the pressurizing chamber 203 by the spring 66 and the needle 63. Therefore, the suction valve 33 is spaced away from the suction valve seat 32, i.e., is opened. In this state, when the plunger 50 is moved toward the cam 5, i.e., in the counter-pressurization direction, the volume of the pressurizing chamber 203 is increased. Thus, the fuel, which is located on the side of the suction valve seat 32 of the suction passage 204, which is opposite to the pressurizing chamber 203, is moved to the other side of the suction valve seat 32 where the pressurizing chamber 203 is placed, and then the fuel is drawn into the pressurizing chamber 203.

In the suction stroke, the fuel of the inflow port 201 can flow into the inflow-side upper passages 211, and the fuel in the inflow-side upper passages 211 can flow into the suction passage 204. Furthermore, the fuel in the suction passage 204 can flow into the pressurizing chamber 203, and the fuel in the fuel reservoir 207 can flow into the inflow-side lower passage 212, the damper-side lower passage 222 and the connection passage 231. Also, the fuel in the damper-side upper passages 221 and the connection passage 231 can flow into the suction passage 204, and the fuel in the variable volume chamber 209 can flow into the fuel reservoir 207.

(Metering Stroke)

In the valve opening state of the suction valve 33, when the plunger 50 is moved toward the side that is opposite to the cam 5, i.e., in the pressurization direction, the volume of the pressurizing chamber 203 is reduced, and the fuel in the pressurizing chamber 203 is returned to the side of the suction valve seat 32 of the suction passage 204, which is opposite to the pressurizing chamber 203. When the electric power is supplied to the coil 67 in the middle of the metering stroke, the movable core 64 is attracted to the stationary core 65 together with the needle 63, so that the suction valve 33 contacts the suction valve seat 32 and is thereby closed. The amount of fuel, which is returned from the pressurizing chamber 203 to the suction passage 204, is adjusted by adjusting the timing of closing the suction valve 33 at the time of moving the plunger 50 in the pressurization direction. As a result, the amount of fuel pressurized in the pressurizing chamber 203 is determined. The metering stroke, during which the fuel is returned from the pressurizing chamber 203 to the suction passage 204, ends when the suction valve 33 is closed.

In the metering stroke, the fuel in the pressurizing chamber 203 can outflow to the suction passage 204, and the fuel in the suction passage 204 can outflow to the inflow-side upper passages 211, the damper-side upper passages 221 and the connection passage 231. Furthermore, the fuel in the inflow-side lower passage 212, the damper-side lower passage 222 and the connection passage 231 can outflow to the fuel reservoir 207, and the fuel in the fuel reservoir 207 can outflow to the variable volume chamber 209.

(Pressurizing Stroke)

When the plunger 50 is moved further in the pressurization direction in the state where the suction valve 33 is closed, the volume of the pressurizing chamber 203 is reduced, and the fuel in the pressurizing chamber 203 is compressed and is pressurized. When the pressure of the fuel in the pressurizing chamber 203 becomes equal to or larger than the valve opening pressure of the discharge valve 43, the discharge valve 43 is opened. Therefore, the fuel flows from the pressurizing chamber 203 toward the pipe 4, i.e., toward the fuel rail through the discharge passage 205 and the discharge passage 130.

When the supply of the electric power to the coil 67 is stopped, the plunger 50 is moved in the counter-pressurization direction. Thus, the suction valve 33 opens once again. In this way, the pressurizing stroke for pressurizing the fuel ends, and the suction stroke for suctioning the fuel from the suction passage 204 into the pressurizing chamber 203 starts once again.

By repeating the suction stroke, the metering stroke and the pressurizing stroke discussed above, the suctioned fuel is pressurized and is discharged by the high-pressure pump 1 to supply the pressurized fuel to the fuel rail. The amount of fuel supplied from the high-pressure pump 1 to the fuel rail is adjusted by controlling, for example, the timing of supplying the electric power to the coil 67 of the electromagnetic drive device 60.

When the plunger 50 is reciprocated in the state where the suction valve 33 is opened during, for example, the suction stroke or the metering stroke, pressure pulsation of the fuel may possibly occur in the damper chamber 208. The pulsation damper 16, which is installed in the damper chamber 208, is resiliently deformed in response to a change in the fuel pressure in the damper chamber 208, so that the pulsation damper 16 can damp the pressure pulsation of the fuel in the damper chamber 208.

Furthermore, in the state where the high-pressure pump 1 continues the discharge of the fuel to the fuel rail side, the fuel, which flows from the inlet 12 into the inflow port 201, flows into the pressurizing chamber 203 through the inflow-side upper passages 211 and the suction passage 204. The fuel, which flows from the inlet 12 into the inflow port 201, flows to the fuel reservoir 207 through the inflow-side lower passage 212. Furthermore, when the plunger 50 reciprocates, the volume of the variable volume chamber 209 increases and decreases. Therefore, at this time, the fuel flows back and forth between the fuel reservoir 207 and the variable volume chamber 209. In this way, the housing main body 11 and the plunger 50, which are heated to have a high temperature by the heat generated though the slide movement between the plunger 50 and the inner peripheral wall of the plunger hole 202 of the housing main body 11, the heat generated through the pressurization of the fuel in the pressurizing chamber 203 and the heat generated from the engine 2, can be cooled with the low temperature fuel. In this way, galling of the plunger 50 and the inner peripheral wall of the plunger hole 202 of the housing main body 11 can be limited.

Furthermore, a portion of the fuel, which is pressurized to the high pressure in the pressurizing chamber 203, can flow into the variable volume chamber 209 through a clearance between the plunger 50 and the inner peripheral wall of the plunger hole 202 of the housing main body 11. In this way, an oil film is formed between the plunger 50 and the inner peripheral wall of the plunger hole 202, so that the galling of the plunger 50 and the inner peripheral wall of the plunger hole 202 can be effectively limited. The fuel, which flows from the pressurizing chamber 203 into the variable volume chamber 209, can flow into the pressurizing chamber 203 once again through the fuel reservoir 207, the inflow-side lower passage 212, the inflow port 201, the inflow-side upper passages 211, the damper-side lower passage 222, the damper-side upper passages 221, the connection passage 231 and the suction passage 204.

Figure 4B:
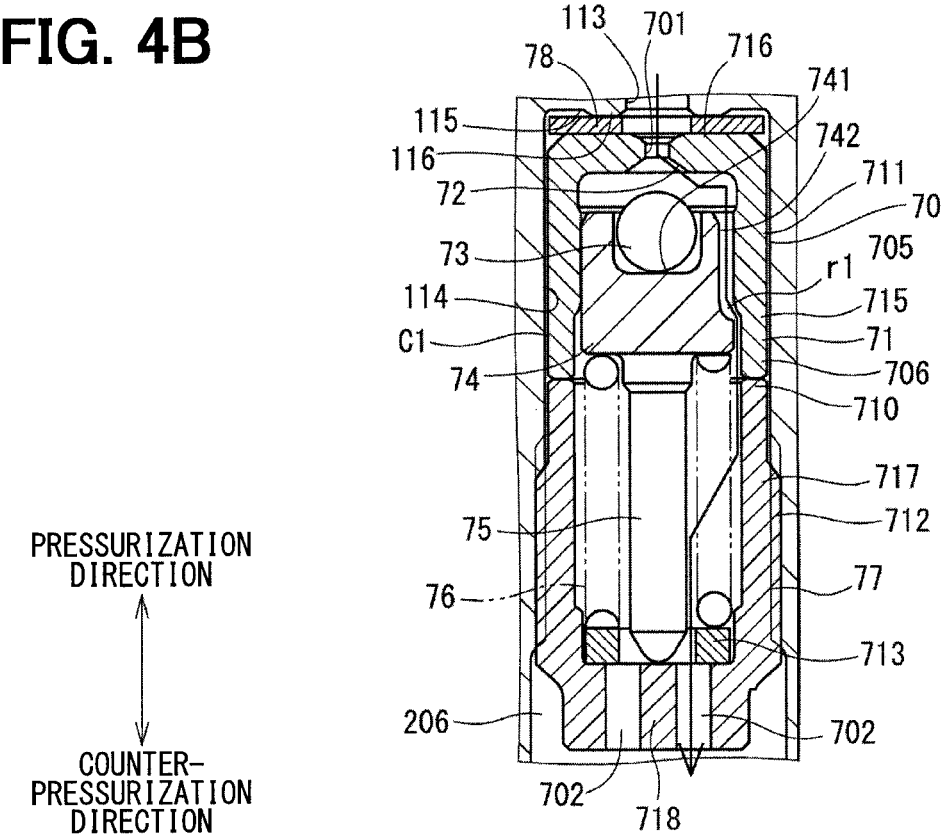
FIG. 4B is a cross-sectional view showing the relief valve device of the high-pressure pump in a valve opening state according to the first embodiment.

In the present embodiment, when the pressure of the discharge passage 205 becomes equal to or larger than the valve opening pressure of the relief valve device 70, the relief valve device 70 is opened (see FIG. 4B). Therefore, the fuel in the discharge passage 205 can flow to the fuel reservoir 207 through: the small diameter region 113 of the relief passage 206; the inside of the seal member 78; the inlet hole 701 of the relief valve device 70; the relief valve seat 72; the flow passage r1 between the cutout 742 of the holder 74 and the tubular portion 715; the inside of the spacer 713; and the outlet holes 702. The fuel, which flows into the fuel reservoir 207 through the relief valve device 70, can flow into the suction passage 204 through the connection passage 231, the inflow-side lower passage 212, the inflow port 201, the inflow-side upper passages 211, the damper-side lower passage 222 and the damper-side upper passages 221.

When the fuel, which is pressurized to the high pressure and is located in the discharge passage 205, flows into the fuel reservoir 207, which has the low pressure, through the relief valve device 70, the fuel is depressurized and thereby has a high temperature and a low pressure. Therefore, bubbles generated by fuel evaporation, i.e., vapor may possibly be generated in the fuel. Particularly, in a case where the valve opening pressure of the relief valve device 70 is set to be relatively high, the vapor tends to be generated.

In the present embodiment, the relief passage 206 extends from the discharge passage 205 in the counter-pressurization direction, which is the moving direction of the plunger 50 at the time of increasing the volume of the pressurizing chamber 203. Therefore, the fuel, which is pressurized to the high pressure and is located in the discharge passage 205, flows in the relief passage 206 in the counter-pressurization direction and passes through the relief valve device 70. Thereafter, the fuel flows into the fuel reservoir 207 and then flows through the connection passage 231, the inflow-side lower passage 212, the inflow port 201, the inflow-side upper passages 211, the damper-side lower passage 222 and the damper-side upper passages 221. Thus, the flow direction of the fuel is inverted such that the fuel flows in the pressurization direction, which is the moving direction of the plunger 50 at the time of decreasing the volume of the pressurizing chamber 203. Thereafter, the fuel is drawn into the pressurizing chamber 203 through the suction valve device 30 of the suction passage 204. As discussed above, in the present embodiment, a length of a path, which connects between the relief valve device 70 and the pressurizing chamber 203, is relatively long. Therefore, even when the vapor is generated in the fuel after passing through the relief valve device 70, the fuel can be cooled before the fuel is drawn into the pressurizing chamber 203, and thereby the vapor in the fuel can be lost. In this way, the suctioning of the vapor into the pressurizing chamber 203 can be limited.

As described above, in the present embodiment, the high-pressure pump 1, which is configured to pressurize fuel, includes the housing 10, the suction valve device 30, the discharge valve device 40, the plunger 50 and the relief valve device 70.

The housing 10 includes: the inflow port 201 that is configured to be supplied with the fuel; the plunger hole 202; the pressurizing chamber 203 that is formed at the one end part of the plunger hole 202 and is configured to pressurize the fuel in the pressurizing chamber 203; the suction passage 204 that is connected to the pressurizing chamber 203, wherein the suction passage 204 is configured to be communicated with the inflow port 201 and is configured to conduct the fuel to be suctioned into the pressurizing chamber 203; the discharge passage 130, 205 that is configured to conduct the fuel that is pressurized in and discharged from the pressurizing chamber 203; and the relief passage 206 that has the one end part connected to the discharge passage 205 while the other end part of the relief passage 206 is configured to be communicated with the suction passage 204.

The suction valve device 30 is placed in the suction passage 204. The suction valve device 30 is configured to enable or limit the flow of the fuel between one side of the suction passage 204, at which the pressurizing chamber 203 is placed, and the other side of the suction passage 204, which is opposite to the pressurizing chamber 203, at the valve opening time or the valve closing time of the suction valve device 30.

The discharge valve device 40 is placed in the discharge passage 130, 205. The discharge valve device 40 is configured to enable or limit the flow of the fuel between the one side of the discharge passage 205, at which the pressurizing chamber 203 is placed, and the other side of the discharge passage 205, which is opposite to the pressurizing chamber 203, at the valve opening time or the valve closing time of the discharge valve device 40.

The plunger 50 is placed at the inside of the plunger hole 202 such that the one end part of the plunger 50 is placed at the pressurizing chamber 203. The plunger 50 is configured to reciprocate in the axial direction to increase or decrease the volume of the pressurizing chamber 203.

The relief valve device 70 is placed in the relief passage 206. The relief valve device 70 is configured to enable or limit the flow of the fuel between the one side of the relief passage 206, at which the discharge passage 205 is located, and the other side of the relief passage 206, which is opposite to the discharge passage 205, at the valve opening time or the valve closing time of the relief valve device 70. Therefore, when the pressure of the discharge passage 205 becomes equal to or larger than the valve opening pressure of the relief valve device 70, the relief valve device 70 is opened. Therefore, the fuel on the discharge passage 205 side of the relief valve device 70 flows to the other side of the relief valve device 70, which is opposite to the discharge passage 205, through the relief valve device 70. In this way, it is possible to limit generation of the abnormally high pressure in the discharge passage 205.

In the present embodiment, one end part of the relief passage 206 is connected to the discharge passage 205, and the other end part of the relief passage 206 is displaced away from the one end part of the relief passage 206 in the counter-pressurization direction, and the relief passage 206 extends from the one end part to the other end part of the relief passage 206. Therefore, the fuel, which is pressurized to the high pressure and is located in the discharge passage 205, flows in the relief passage 206 in the counter-pressurization direction and passes through the relief valve device 70. Thereafter, the flow direction of the fuel is inverted such that the fuel flows in the pressurization direction. Thereafter, the fuel is drawn into the pressurizing chamber 203 through the suction valve device 30 at the suction passage 204. As discussed above, in the present embodiment, the length of the path, which connects between the relief valve device 70 and the pressurizing chamber 203, is relatively long. Therefore, even when the vapor is generated in the fuel after passing through the relief valve device 70, the fuel can be cooled before the fuel is drawn into the pressurizing chamber 203, and thereby the vapor in the fuel can be lost. In this way, the suctioning of the vapor into the pressurizing chamber 203 can be limited. Thus, generation of the vapor lock phenomenon is limited, and thereby it is possible to limit the disablement of the pressurization and the discharge of the fuel at the high-pressure pump 1.

Furthermore, in the present embodiment, the housing 10 includes the fuel reservoir 207 that is placed at the side of the plunger 50, which is opposite to the pressurizing chamber 203, while the fuel reservoir 207 is located on the radially outer side of the plunger 50 and is configured to accumulate the fuel. The relief passage 206 is connected to the suction passage 204 through the fuel reservoir 207. Therefore, the fuel, which flows from the discharge passage 205 and passes through the relief valve device 70, can merge into the suction passage 204 through the fuel reservoir 207. In the present embodiment, since the fuel reservoir 207 is present between the relief valve device 70 and the suction passage 204, it is possible to increase the length of the path that connects between the relief valve device 70 and the pressurizing chamber 203. Therefore, even when the vapor is generated in the fuel after passing through the relief valve device 70, the fuel can be cooled before the fuel is drawn into the pressurizing chamber 203, and thereby the vapor in the fuel can be reliably lost.

Furthermore, in the present embodiment, the fuel, which flows from the discharge passage 205 and passes through the relief valve device 70, is enabled to flow into the pressurizing chamber 203 through the fuel reservoir 207 and the inflow port 201. Therefore, even if the fuel in the fuel reservoir 207 is heated by the heat received from the engine 2 or the like and becomes the high temperature, the fuel is cooled after passing through the inflow port 201. In this way, the vapor contained in the fuel can be lost before the fuel enters the pressurizing chamber 203.

Furthermore, in the present embodiment, the fuel, which enters the inflow port 201, is enabled to flow to the suction valve device 30 through the fuel reservoir 207. Therefore, even if the temperature of the fuel in the fuel reservoir 207 rises due to the heat received from the engine 2 or the like, the fuel from the inflow port 201 pushes the fuel in the fuel reservoir 207 toward the suction valve device 30. Therefore, it is possible to limit the rise of the temperature of the fuel in the fuel reservoir 207 to the high temperature that would be caused by the heat received from the engine 2 or the like.

As a result, it is possible to limit the inflow of the high temperature fuel into the suction valve device 30. Thus, it is possible to effectively limit the suctioning of the vapor into the pressurizing chamber 203.

Furthermore, in the present embodiment, the housing 10 includes the housing main body 11, at which the plunger hole 202 is formed. In the present embodiment, the spring (serving as the plunger urging member) 54 and the seat upper 14 are further provided. The spring 54 has the one end part connected to the plunger 50 and is configured to urge the plunger 50 in the counter-pressurization direction. The seat upper 14 is placed on the radially outer side of the plunger 50 and forms the fuel reservoir 207 between the seat upper 14 and the housing main body 11. The other end part of the spring 54 is engaged to the seat upper 14. As discussed above, in the present embodiment, the seat upper 14, to which the spring 54 is engaged, forms the fuel reservoir 207. Therefore, it is not required to separately provide a member, which forms the fuel reservoir 207. Thus, the number of the components can be reduced.

Furthermore, in the present embodiment, the damper chamber 208 and the pulsation damper 16 are further provided. The damper chamber 208 is branched from the damper-side lower passage 222 and the damper-side upper passages 221, which connect between the fuel reservoir 207 and the suction passage 204. The pulsation damper 16 is placed at the damper chamber 208 and is configured to damp the pressure pulsation of the fuel. In this way, it is possible to limit the transmission of the pressure pulsation to the pipe 3 and the vibration of the high-pressure pump 1. Furthermore, the damper chamber 208 is branched from the passage, which connects between the fuel reservoir 207 and the suction passage 204. Therefore, it is possible to limit the flow of the high temperature fuel, which is heated to the high temperature at the fuel reservoir 207, into the damper chamber 208. In this way, it is possible to limit the increase of the temperature of the damper chamber 208. Therefore, it is possible to limit a change in the characteristic of the pulsation damper 16 that would be result from the increase of the temperature of the damper chamber 208.

Furthermore, according to the present embodiment, the housing 10 is configured to be installed to the engine 2 such that the side of the plunger hole 202, which is opposite to the pressurizing chamber 203, faces the engine 2. In the state where the housing 10 is installed to the engine 2, the relief valve device 70 is placed on the engine 2 side of the discharge valve device 40.

In the high-pressure pump 1, in order to ensure the required flow rate at the high fuel pressure, the slide length of the plunger 50 needs to be increased to reduce a leak flow rate. It is desirable that the discharge passage 205, in which the discharge valve device 40 is placed, is located adjacent to the pressurizing chamber 203, i.e., is located on the side of the plunger 50 that is opposite to the engine 2 in order to reduce a dead volume of the high-pressure pump 1. In this case, a relatively large space can be ensured on the lower side of the discharge valve device 40, i.e., on the engine 2 side of the discharge valve device 40. Therefore, by placing the relief valve device 70 in this space, it is possible to limit an increase in the size of the housing 10. Furthermore, since the length of the spring 76, which urges the relief valve 73 toward the relief valve seat 72, can be increased, the urging force of the spring 76 can be increased. Therefore, a seat diameter of the relief valve 73 can be set to be relatively large, and thereby a diameter of the flow passage on the upstream side of the relief valve seat 72, i.e., an inner diameter of the inlet hole 701 can be made relatively large.

Thus, a required relief flow rate, which is required at the time of generating an abnormal pressure at the discharge passage 205, can be ensured.

Furthermore, in the present embodiment, the relief valve device 70 is arranged such that the relief valve device 70 entirely overlaps with the plunger 50 in the axial direction of the plunger 50. Therefore, the relief valve device 70 can be placed at the housing main body 11 while limiting an increase in the size of the housing main body 11 in the axial direction of the plunger 50.

Furthermore, in the present embodiment, the relief valve device 70 is placed at the location that is other than the inflow port 201, the plunger hole 202, the pressurizing chamber 203, the suction passage 204 and the discharge passage 205 in the housing 10, i.e., the relief valve device 70 is placed at a remaining space of the housing main body 11. Therefore, the relief valve device 70 can be placed at the housing main body 11 while limiting an increase in the size of the housing main body 11.

Furthermore, in the present embodiment, the relief valve device 70 includes: the relief tubular member 71, at which the relief valve seat 72 is formed; the relief valve 73 that is received in the relief tubular member 71 and is configured to contact the relief valve seat 72; and the spring (serving as the relief urging member) 76 that is received in the relief tubular member 71 and urges the relief valve 73 toward the relief valve seat 72. The relief valve device 70 is formed as the assembly, as described above. Therefore, the relief valve device 70 can be easily assembled to the housing main body 11. Thereby, it is possible to limit a change in the valve opening pressure of the relief valve device 70 between the time before the assembling and the time after the assembling, which would be caused by biting of a foreign object between the components of the relief valve device 70.

Furthermore, in the present embodiment, the relief tubular member 71 has the threaded part 77 that is configured to be threadably coupled with the housing 10.

In a case where the relief tubular member is fixed to the housing by press fitting or welding, the plunger hole of the housing may possibly be deformed such that a clearance of a sliding portion of the plunger is reduced, and thereby the plunger may possibly be seized. Further, in the case of the conventional seal, which is implemented by the press-fitting, i.e., the seal, which is implemented between the inner peripheral wall of the housing and the outer peripheral wall of the relief tubular member, it is difficult to ensure the required sealing performance upon the recent progress in the high pressurization.

However, in the present embodiment, the relief tubular member 71 is threadably coupled to the housing 10. Therefore, at the time of assembling the relief valve device 70 to the housing 10, the high pressure fuel can be reliably sealed while limiting the deformation of the plunger hole 202 of the housing 10.

Furthermore, according to the present embodiment, the relief tubular member 71 includes the first tubular member 711, at which the relief valve seat 72 is formed, and the second tubular member 712, which is formed separately from the first tubular member 711 and has the threaded part 77. The first tubular member 711 and the second tubular member 712 are fixed together such that the first tubular member 711 and the second tubular member 712 are coaxial with each other and are immovable relative to each other.

The member, which forms the relief valve seat 72, needs to have the high hardness. Here, when the threaded part 77 is formed at the member that has the high hardness, a delayed fracture may possibly occur. In the present embodiment, since the first tubular member 711 and the second tubular member 712 are formed separately, the first tubular member 711 can have the relatively high hardness, and the second tubular member 712 can have the relatively low hardness. In this way, the required hardness of the first tubular member 711, at which the relief valve seat 72 is formed, is ensured, and the threaded part 77 can be formed at the second tubular member 712 to limit the delayed fracture.

Furthermore, in the present embodiment, the first tubular member 711 and the second tubular member 712 are fixed together such that the first tubular member 711 and the second tubular member 712 are immovable relative to each other. Therefore, it is possible to limit a change in the valve opening pressure of the relief valve device 70, which would be caused by biting of the foreign object between the first tubular member 711 and the second tubular member 712, at, for example, the time of assembling the relief valve device 70 to the housing 10.

Furthermore, in the present embodiment, the fluid tightness is maintained at the connection between the end part of the relief tubular member 71, which is placed on the side where the discharge passage 205 is located, and the inner wall of the housing 10. As described above, an end surface of the relief tubular member 71, which is located on the discharge passage 205 side, is formed as the seal surface. Thereby, the high pressure can be sealed while keeping the small size of the radial space of the seal portion.

Furthermore, in the present embodiment, there is provided the seal member 78. The seal member 78 has the hardness that is lower than the hardness of the relief tubular member 71 and the hardness of the housing 10. Furthermore, the seal member 78 is placed between the end part of the relief tubular member 71, which is placed on the side where the discharge passage 205 is placed, and the inner wall of the housing 10. The seal member 78 is configured to maintain the fluid tightness between the relief tubular member 71 and the housing 10.

The housing 10 needs to have the high hardness to withstand the high fuel pressure, and the relief tubular member 71 needs to have the high hardness to ensure a required seat performance of the relief valve 73. In order to ensure the required sealing performance between the members having the high hardness, a high contact surface pressure, i.e., a high axial load is required. In the present embodiment, the seal member 78, which has the hardness that is lower than the hardness of the relief tubular member 71 and the hardness of the housing 10, is placed between the end part of the relief tubular member 71, which is located on the side where the discharge passage 205 is placed, and the inner wall of the housing 10. In this way, the required sealing performance can be ensured with a relatively small axial force. Therefore, the strength of threaded part 77 can be ensured at the relatively small space. In this way, the size of the relief valve device 70 can be reduced while ensuring the required sealing performance between the end part of the relief tubular member 71, which is located on the side where the discharge passage 205 is placed, and the inner wall of the housing 10.

Second Embodiment

FIGS. 5 to 8 show a high-pressure pump according to a second embodiment. The second embodiment differs from the first embodiment with respect to the configuration of the relief valve device 70 and the arrangement of the damper chamber 208.

In the second embodiment, the relief passage 206 extends from the discharge passage 205 toward the pressurizing chamber 203 and then extends toward the counter-pressurization direction in parallel with the axis Ax1 of the plunger hole 202. Thereafter, the relief passage 206 is connected to the fuel reservoir 207. Specifically, one end part of the relief passage 206 is connected to the discharge passage 205, and the other end part of the relief passage 206 extends in the counter-pressurization direction.

The relief valve device 70 includes the relief tubular member 71, the relief valve 73, the holder 74 and the spring 76.

The relief tubular member 71 includes the first tubular member 711 and the second tubular member 712.

The first tubular member 711 is shaped into a substantially cylindrical tubular form. The first tubular member 711 is placed in the relief passage 206 such that an outer peripheral wall of the first tubular member 711 is fitted to an inner peripheral wall of the relief passage 206 of the housing main body 11. The first tubular member 711 is placed such that an axis of the first tubular member 711 is parallel with the axis Ax1 of the plunger hole 202. The inlet hole 701 is formed at the inside of the first tubular member 711. The relief valve seat 72 is formed around the inlet hole 701 at the end surface of the first tubular member 711 located on the fuel reservoir 207 side.

The second tubular member 712 is shaped into a bottomed cylindrical tubular form. The second tubular member 712 is placed in the relief passage 206 such that the outer peripheral wall of the second tubular member 712 is fitted to the inner peripheral wall of the relief passage 206 of the housing main body 11 in a state where the bottom of the second tubular member 712 faces the fuel reservoir 207. The second tubular member 712 is located on the fuel reservoir 207 side of the first tubular member 711. An outlet hole 702 is formed at the bottom of the second tubular member 712.

The relief valve 73 is shaped in a spherical form and is configured to contact the relief valve seat 72.

The holder 74 is placed on the second tubular member 712 side of the relief valve 73. The holder 74 holds the relief valve 73.

The spring 76 is placed between the holder 74 and the bottom of the second tubular member 712. The spring 76 urges the holder 74 and the relief valve 73 toward the relief valve seat 72. Thereby, the relief valve 73 is urged against the relief valve seat 72.

When a pressure of the fuel in the space located on the discharge passage 205 side of the relief valve seat 72 becomes larger than a sum (a valve opening pressure of the relief valve device 70) of the pressure of the fuel in the space located on the opposite side of the relief valve seat 72, which is opposite to the discharge passage 205, and the urging force of the spring 76, the relief valve 73 is moved away from the relief valve seat 72 and is thereby opened. In this way, the fuel on the discharge passage 205 side of the relief valve seat 72 flows to the opposite side of the relief valve seat 72, which is opposite to the discharge passage 205. The valve opening pressure of the relief valve device 70 can be set by adjusting the urging force of the spring 76 and the amount of press fitting of the second tubular member 712 into the relief passage 206.

In the second embodiment, the damper chamber forming portion 15 is placed on the side of the pressurizing chamber 203 of the housing main body 11, which is opposite to the plunger 50. The damper chamber forming portion 15 is shaped in a bottomed cylindrical tubular form and is made of, for example, metal. The damper chamber forming portion 15 is placed to cover the end surface of the housing main body 11, which is located on the upper recess 101 side. Therefore, the damper chamber forming portion 15 forms the damper chamber 208, which is shaped in a substantially circular disk form, at a location between an inner wall of the damper chamber forming portion 15 and the end surface of the housing main body 11. The pulsation damper 16 is placed at the damper chamber 208. Here, the damper chamber forming portion 15 and the pulsation damper 16 are coaxial with the plunger hole 202.

Figure 7:
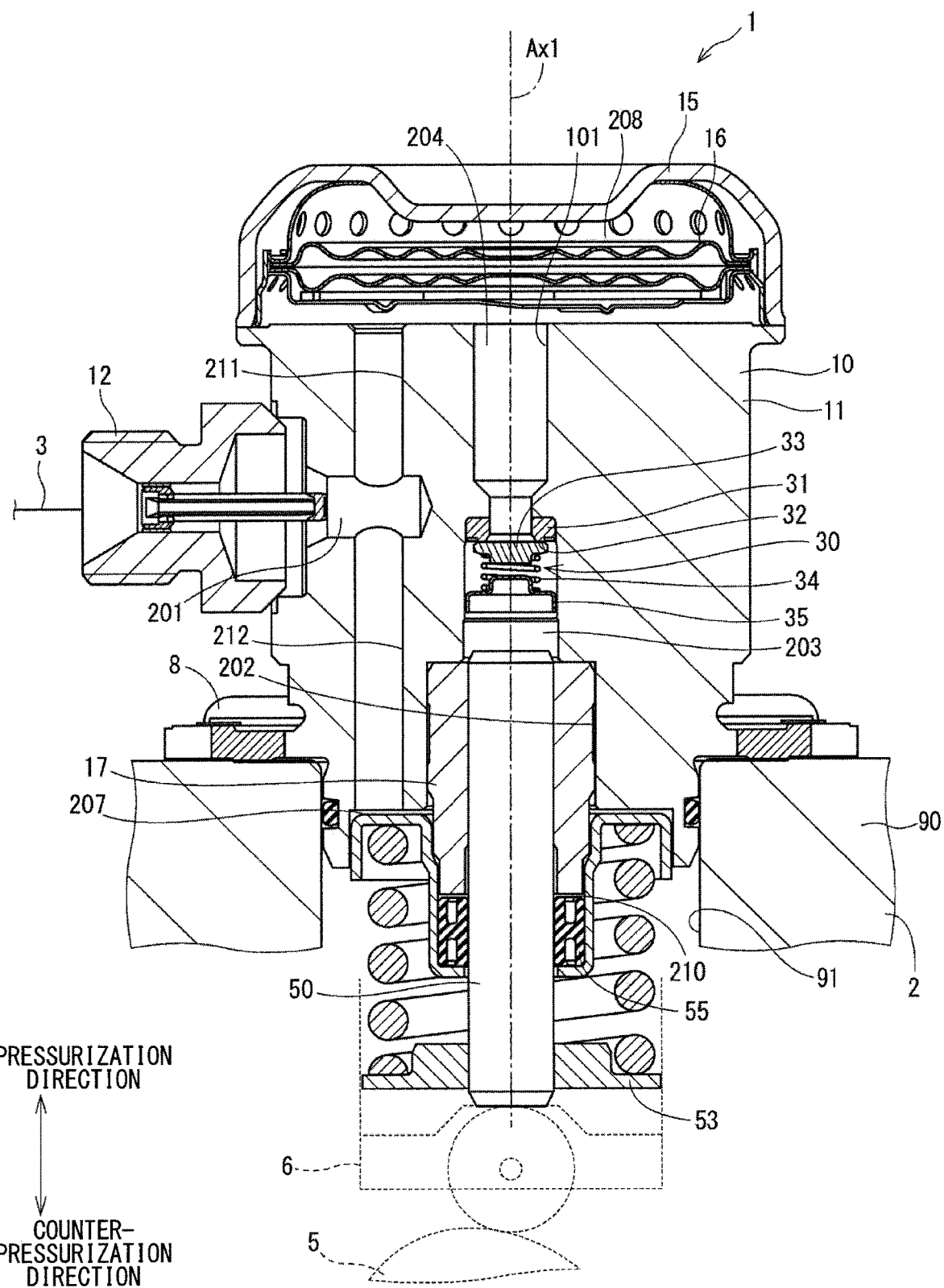
FIG. 7 is a cross-sectional view showing the high-pressure pump according to the second embodiment.
Figure 8:
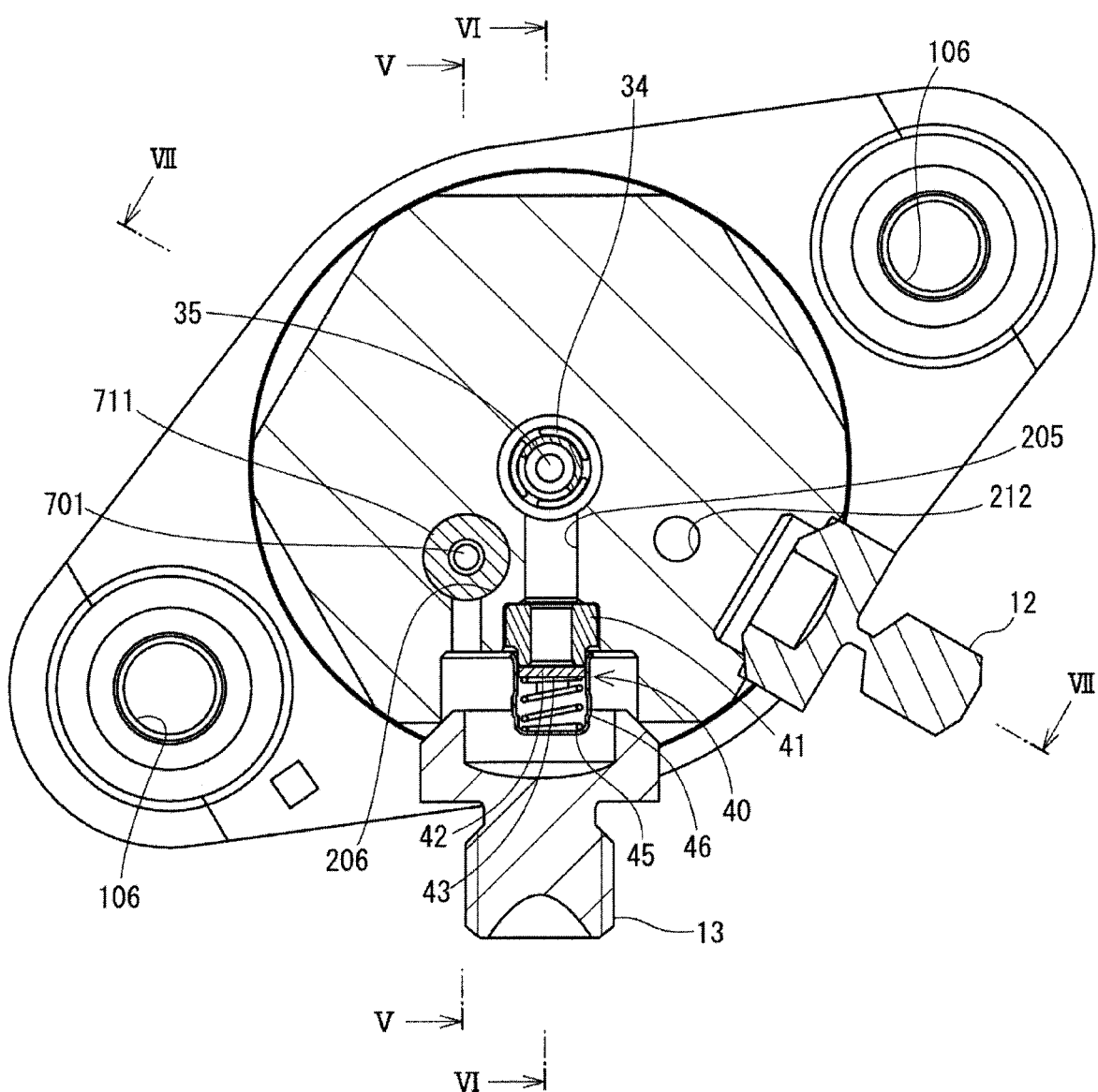
FIG. 8 is a cross-sectional view taken along line VIII-VIII in FIG. 5.

The damper chamber 208 is communicated with the inflow-side upper passages 211 and the suction passage 204 (see FIG. 7). Specifically, in the second embodiment, the damper chamber 208 is formed between the fuel reservoir 207 and the pressurizing chamber 203.

The suction valve device 30 includes the suction valve seat element 31, the suction valve 33, the spring 34 and the stopper 35.

The suction valve seat element 31 is shaped in a substantially annular form. The suction valve seat element 31 is placed in the suction passage 204 such that an outer peripheral wall of the suction valve seat element 31 is fitted to the inner peripheral wall of the suction passage 204 of the housing main body 11. The suction valve seat 32 is formed around a center hole at an end surface of the suction valve seat element 31 located on the pressurizing chamber 203 side.

The suction valve 33 is shaped in a substantially circular disk form and is configured to contact the suction valve seat 32 through one end surface of the suction valve 33.

The stopper 35 is placed in the suction passage 204 such that an outer peripheral wall of the stopper 35 is fitted to an inner peripheral wall of the suction passage 204 of the housing main body 11. The stopper 35 is placed on the side of the suction valve 33 where the pressurizing chamber 203 is located.

The other end surface of the suction valve 33 is configured to contact the stopper 35. When the suction valve 33 contacts the stopper 35, the stopper 35 limits movement of the suction valve 33 toward the pressurizing chamber 203.

The spring 34 is placed between the suction valve 33 and the stopper 35. The spring 34 urges the suction valve 33 toward the suction valve seat 32. Therefore, the suction valve 33 is urged against the suction valve seat 32.

When a pressure of the fuel in the space located on the side of the suction valve seat 32, which is opposite to the pressurizing chamber 203, becomes larger than a sum (a valve opening pressure of the suction valve device 30) of the pressure of the fuel in the space located on the pressurizing chamber 203 side of the suction valve seat 32 and the urging force of the spring 34, the suction valve 33 is moved away from the suction valve seat 32 and is thereby opened. Thus, the fuel, which is located on the side of the suction valve seat 32 that is opposite to the pressurizing chamber 203, flows toward the side of the suction valve seat 32 where the pressurizing chamber 203 is located. The valve opening pressure of the suction valve device 30 can be set by adjusting the urging force of the spring 34.

In the second embodiment, the electromagnetic drive device 60 discussed in the first embodiment is not provided.

The discharge valve device 40 includes a discharge valve seat element 41, the discharge valve 43, the spring 44 and a spring holder 46.

The discharge valve seat element 41 is shaped in a substantially cylindrical tubular form. The discharge valve seat element 41 is placed in the discharge passage 205 and the discharge passage 130 such that an outer peripheral wall of the discharge valve seat element 41 is fitted to the inner peripheral wall of the discharge passage 205 of the housing main body 11. A discharge valve seat 42 is formed around a center hole at an end surface of the discharge valve seat element 41 located on the side that is opposite to the pressurizing chamber 203.

The discharge valve 43 is shaped in a substantially circular disk form. The discharge valve 43 is configured to reciprocate on the side of the discharge valve seat 42 that is opposite to the pressurizing chamber 203. One end surface of the discharge valve 43 is configured to contact the discharge valve seat 42.

The spring holder 46 is shaped in a bottomed cylindrical tubular form and is made of, for example, metal. An inner peripheral wall of an opening end of the spring holder 46 is fitted to an outer peripheral wall of the discharge valve seat element 41.

The spring 44 is placed between the discharge valve 43 and a bottom of the spring holder 46. The spring 44 urges the discharge valve 43 toward the discharge valve seat 42. Thereby, the discharge valve 43 is urged against the discharge valve seat 42.

The spring holder 46 includes a plurality of holes that connect between an inner wall and an outer wall of the spring holder 46. Therefore, the fuel at an inside of the spring holder 46 flows to an outside of the spring holder 46 through the holes of the spring holder 46.

In the second embodiment, an outer diameter of the plunger 50 is constant from one end part to the other end part of the plunger 50. That is, the large diameter portion 51 and the small diameter portion 52 discussed in the first embodiment are not formed at the plunger 50.

Furthermore, in the second embodiment, the housing 10 includes a cylinder 17. The cylinder 17 is shaped in a substantially cylindrical tubular form and is arranged such that an outer peripheral wall of the cylinder 17 is fitted to an inner peripheral wall of the plunger hole 202 of the housing main body 11. An inner diameter of the cylinder 17 is set to be substantially the same as or slightly larger than an outer diameter of the plunger 50. An outer peripheral wall of the plunger 50 is configured to slide along an inner peripheral wall of the cylinder 17 and is supported by the cylinder 17 in a manner that enables the reciprocation of the plunger 50 in the axial direction.

Figure 5:
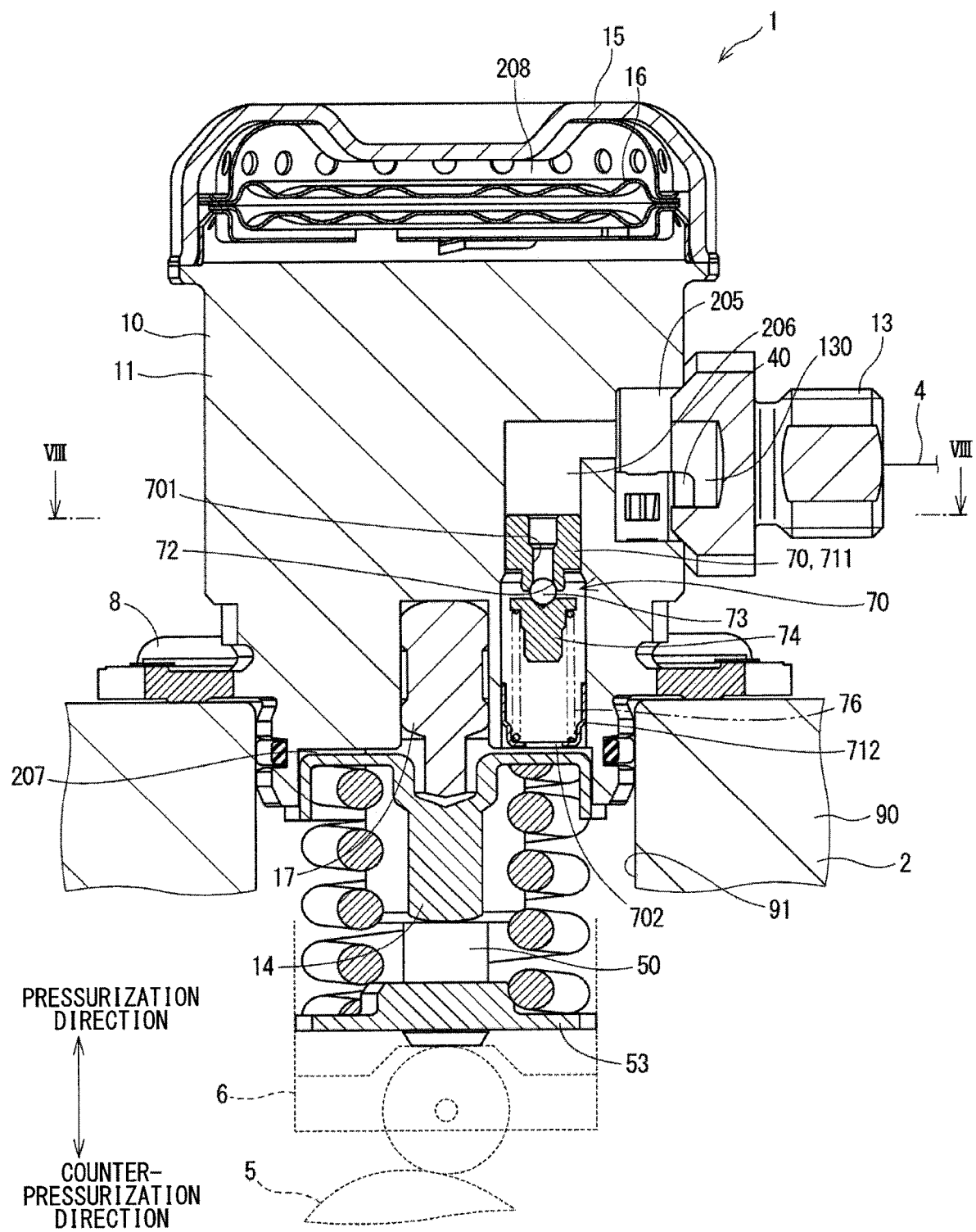
FIG. 5 is a cross-sectional view showing a high-pressure pump according to a second embodiment.
Figure 6:
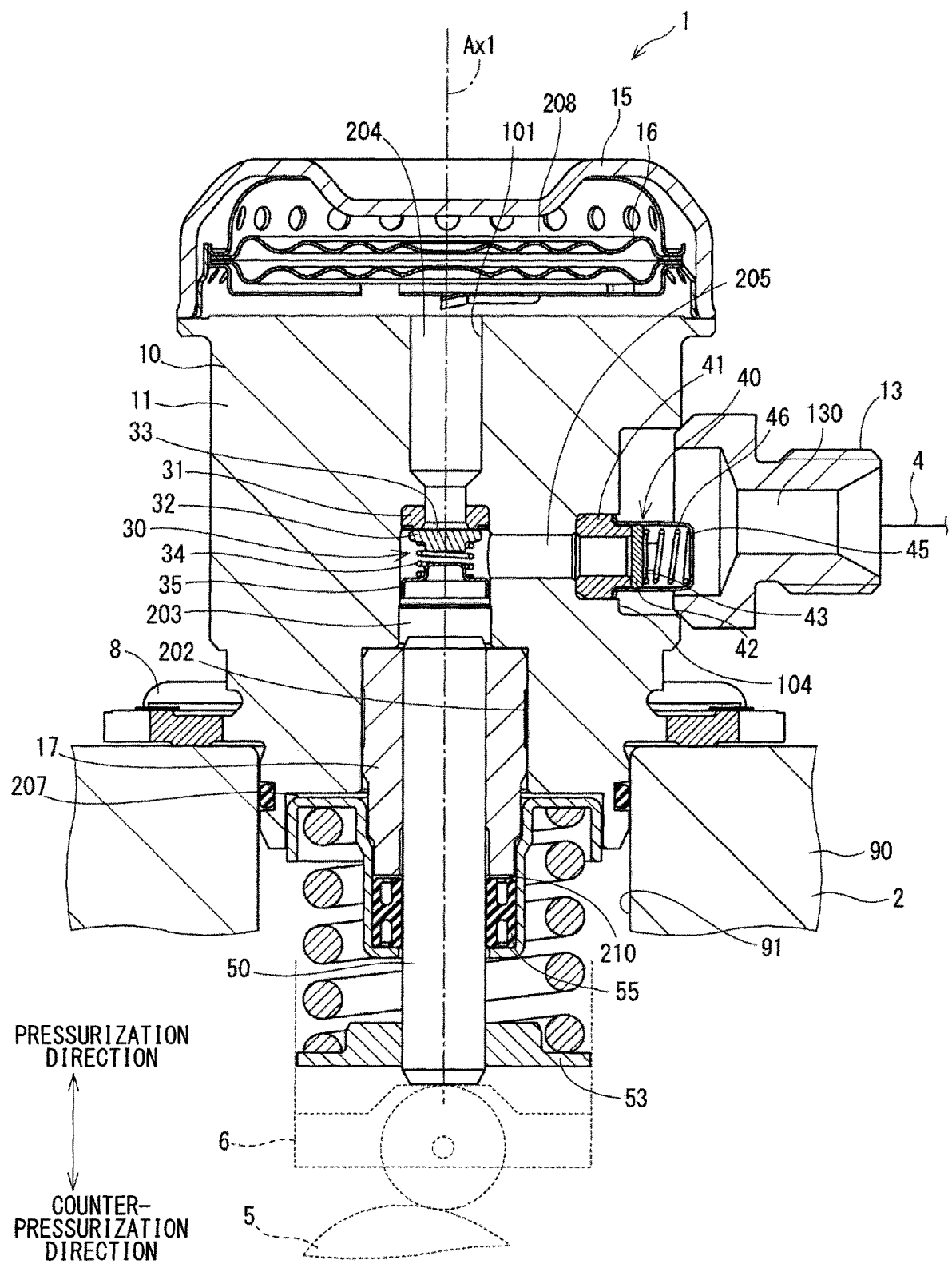
FIG. 6 is a cross-sectional view showing the high-pressure pump according to the second embodiment.

Furthermore, in the second embodiment, the relief valve device 70 is arranged such that the relief valve device 70 partially overlaps with the plunger 50 in the axial direction of the plunger 50 (see FIG. 5).

Furthermore, in the second embodiment, the variable volume chamber 209, which is discussed in the first embodiment, is not formed at the housing 10. However, an annular space 210 is formed between: the outer peripheral wall of the plunger 50; and the cylinder 17 and the seal 55 (see FIGS. 6 and 7). The space 210 is communicated with the fuel reservoir 207 through a gap between the outer peripheral wall of the cylinder 17 and the inner peripheral wall of the seat upper 14.

Other than the above described points, the structure of the second embodiment is similar to that of the first embodiment.

As described above, in the present embodiment, the damper chamber 208 and the pulsation damper 16 are additionally provided. The damper chamber 208 is formed between the fuel reservoir 207 and the pressurizing chamber 203. The pulsation damper 16 is placed at the damper chamber 208 and is configured to damp the pressure pulsation of the fuel. In this way, it is possible to limit the transmission of the pressure pulsation to the pipe 3 and the vibration of the high-pressure pump 1. Furthermore, the fuel, which passes through the relief valve device 70 and is thereby heated to the high temperature, can flow into the damper chamber 208 through the fuel reservoir 207, so that an increase in the temperature of the damper chamber 208 can be limited. Thereby, it is possible to limit a change in the characteristic of the pulsation damper 16 that would be caused by the increase in the temperature of the damper chamber 208.

Other Embodiments

In another embodiment of the present disclosure, the fuel, which flows from the discharge passage 205 and passes through the relief valve device 70, may flow into the pressurizing chamber 203 without passing through the fuel reservoir 207.

Furthermore, in another embodiment of the present disclosure, the fuel, which enters the inflow port 201, may flow to the suction valve device 30 without passing through the fuel reservoir 207.

Furthermore, in another embodiment of the present disclosure, the fuel reservoir 207 may be formed by the housing main body 11 and a member that is different form the seat upper 14.

Furthermore, in another embodiment of the present disclosure, the fuel reservoir 207 may be eliminated from the housing 10.

Furthermore, in another embodiment of the present disclosure, the damper chamber 208 may be eliminated from the housing 10. Furthermore, the pulsation damper 16 may be eliminated.

Also, in another embodiment of the present disclosure, the seal member 78 may be eliminated.

In another embodiment of the present disclosure, the high-pressure pump may be implemented as a fuel pump that discharges the fuel to another device that is other than the engine of the vehicle.

As described above, the present disclosure should not be limited to the above embodiments and may be implemented in various other forms within a principle of the present disclosure.

The present disclosure has been described with reference to the embodiments. However, the present disclosure should not be limited to the embodiments and the structures described therein. The present disclosure covers various modifications and variations on the scope of equivalents. Also, various combinations and forms as well as other combinations, each of which includes only one element or more or less of the various combinations, are also within the scope and spirit of the present disclosure.

What is claimed is:

1. A high-pressure pump that is configured to pressurize fuel, comprising:
    a housing that includes:
        an inflow port that is configured to be supplied with the fuel;
        a plunger hole;
        a pressurizing chamber that is formed at one end part of the plunger hole and is configured to pressurize the fuel in the pressurizing chamber;
        a suction passage that is connected to the pressurizing chamber, wherein the suction passage is configured to be communicated with the inflow port and is configured to conduct the fuel to be suctioned into the pressurizing chamber;
        a discharge passage that is configured to conduct the fuel, which is pressurized in and discharged from the pressurizing chamber; and
        a relief passage that has one end part connected to the discharge passage while another end part of the relief passage is configured to be communicated with the suction passage;
    a suction valve device that is placed in the suction passage, wherein the suction valve device is configured to enable or limit a flow of the fuel between one side of the suction passage, at which the pressurizing chamber is located, and another side of the suction passage, which is opposite to the pressurizing chamber, at a valve opening time or a valve closing time of the suction valve device;
    a discharge valve device that is placed in the discharge passage, wherein the discharge valve device is configured to enable or limit a flow of the fuel between one side of the discharge passage, at which the pressurizing chamber is located, and another side of the discharge passage, which is opposite to the pressurizing chamber, at a valve opening time or a valve closing time of the discharge valve device;
    a plunger that is placed at an inside of the plunger hole such that one end part of the plunger is placed at the pressurizing chamber, wherein the plunger is configured to reciprocate in an axial direction to increase or decrease a volume of the pressurizing chamber; and
    a relief valve device that is placed in the relief passage and is configured to enable or limit a flow of the fuel between one side of the relief passage, at which the discharge passage is located, and another side of the relief passage, which is opposite to the discharge passage, at a valve opening time or a valve closing time of the relief valve device, wherein:
    one end part of the relief passage is connected to the discharge passage, and another end part of the relief passage is spaced away from the one end part of the relief passage in a counter-pressurization direction that is a moving direction of the plunger at a time of increasing the volume of the pressurizing chamber, and the relief passage extends from the one end part to the another end part of the relief passage;
    the housing includes a fuel reservoir that is placed at a side of the plunger, which is opposite to the pressurizing chamber;
    the fuel reservoir is located on a radially outer side of the plunger and is configured to accumulate the fuel;
    the relief passage is connected to the suction passage through the fuel reservoir; and
    the fuel, which enters the inflow port, is enabled to flow to the suction valve device through the fuel reservoir.

2. The high-pressure pump according to claim 1, wherein the fuel, which flows from the discharge passage and passes through the relief valve device, is enabled to flow into the pressurizing chamber through the fuel reservoir and the inflow port.

3. The high-pressure pump according to claim 1, wherein:
    the housing includes a housing main body, at which the plunger hole is formed; and
    the high-pressure pump further comprises:
        a plunger urging member that has one end part connected to the plunger and is configured to urge the plunger in the counter-pressurization direction; and
        a seat upper that is placed on the radially outer side of the plunger and forms the fuel reservoir between the seat upper and the housing main body, wherein another end part of the plunger urging member is engaged to the seat upper.

4. The high-pressure pump according to claim 1, further comprising:
   a damper chamber that is formed between the fuel reservoir and the pressurizing chamber; and
   a pulsation damper that is placed at the damper chamber and is configured to damp a pressure pulsation of the fuel.

5. The high-pressure pump according to claim 1, further comprising:
   a damper chamber that is branched from a passage, which connects between the fuel reservoir and the suction passage; and
   a pulsation damper that is placed at the damper chamber and is configured to damp a pressure pulsation of the fuel.

6. The high-pressure pump according to claim 1, wherein:
   the housing is configured to be installed to an internal combustion engine such that a side of the plunger hole, which is opposite to the pressurizing chamber, faces the internal combustion engine; and
   the relief valve device is placed on a side of the discharge valve device, at which the internal combustion engine is located, in a state where the housing is installed to the internal combustion engine.

7. The high-pressure pump according to claim 1, wherein the relief valve device partially or entirely overlaps with the plunger in an axial direction of the plunger.

8. The high-pressure pump according to claim 1, wherein the relief valve device is placed at a location that is other than the inflow port, the plunger hole, the pressurizing chamber, the suction passage and the discharge passage in the housing.

9. The high-pressure pump according to claim 1, wherein the relief valve device includes:
   a relief tubular member, at which a relief valve seat is formed;
   a relief valve that is received in the relief tubular member and is configured to contact the relief valve seat; and
   a relief urging member that is received in the relief tubular member and urges the relief valve toward the relief valve seat.

10. The high-pressure pump according to claim 9, wherein the relief tubular member has a threaded part that is configured to be threadably coupled with the housing.

11. The high-pressure pump according to claim 10, wherein:
    the relief tubular member includes a first tubular member, at which the relief valve seat is formed, and a second tubular member, which is formed separately from the first tubular member and has the threaded part; and
    the first tubular member and the second tubular member are fixed together such that the first tubular member and the second tubular member are coaxial with each other and are immovable relative to each other.

12. The high-pressure pump according to claim 9, wherein fluid tightness is maintained at a connection between an end part of the relief tubular member, which is placed on a side where the discharge passage is located, and an inner wall of the housing.

13. The high-pressure pump according to claim 9, further comprising a seal member that has a hardness lower than a hardness of the relief tubular member and a hardness of the housing, wherein:
    the seal member is placed between an end part of the relief tubular member, which is placed on a side where the discharge passage is located, and an inner wall of the housing; and
    the seal member is configured to maintain fluid tightness between the relief tubular member and the housing.

\* \* \* \* \*